(12) United States Patent
Sridharan et al.

(10) Patent No.: US 12,471,094 B2
(45) Date of Patent: Nov. 11, 2025

(54) TRANSPORT BLOCK TRANSMISSION OVER MULTIPLE TIME SLOTS

(71) Applicant: QUALCOMM Incorporated, San Diego, CA (US)

(72) Inventors: Gokul Sridharan, Sunnyvale, CA (US); Muhammad Sayed Khairy Abdelghaffar, San Jose, CA (US); Hung Dinh Ly, San Diego, CA (US); Abdelrahman Mohamed Ahmed Mohamed Ibrahim, San Diego, CA (US); Ahmed Attia Abotabl, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 861 days.

(21) Appl. No.: 17/727,398

(22) Filed: Apr. 22, 2022

(65) Prior Publication Data

US 2023/0345491 A1   Oct. 26, 2023

(51) Int. Cl.
| | |
|---|---|
| H04W 72/21 | (2023.01) |
| H04L 1/08 | (2006.01) |
| H04L 1/1607 | (2023.01) |
| H04L 5/14 | (2006.01) |
| H04W 72/0446 | (2023.01) |
| H04W 72/23 | (2023.01) |

(52) U.S. Cl.
CPC ............ *H04W 72/21* (2023.01); *H04L 1/08* (2013.01); *H04L 1/1642* (2013.01); *H04L 5/14* (2013.01); *H04W 72/0446* (2013.01); *H04W 72/23* (2023.01)

(58) Field of Classification Search
CPC . H04W 72/21; H04W 72/0446; H04W 72/23; H04L 1/08; H04L 1/1642; H04L 5/14
See application file for complete search history.

(56) References Cited

U.S. PATENT DOCUMENTS

| | | | |
|---|---|---|---|
| 2022/0045789 A1* | 2/2022 | Karmoose | H04L 5/0048 |
| 2022/0346091 A1* | 10/2022 | Karmoose | H04L 1/0072 |
| 2024/0397492 A1* | 11/2024 | Liang | H04L 1/1819 |
| 2025/0089054 A1* | 3/2025 | You | H04W 72/232 |

\* cited by examiner

*Primary Examiner* — Basil Ma
(74) *Attorney, Agent, or Firm* — Holland & Hart LLP

(57) ABSTRACT

Methods, systems, and devices for wireless communications are described. A device may receive a resource allocation for transmitting a transport block (TB) over a set of time slots. The TB may include a set of coded bits. In some aspects, the device may determine starting indexes of subsets of the coded bits, each subset of the coded bits may be for transmission during a respective subset of time slots. In some other aspects, the device may receive a configured grant for a transmission of the TB over the set of time slots. In other aspects, the device may scale a size of the TB based on a first value independent of a second value associated with a number of time slots associated with the set of time slots. The device may transmit the TB over the set of time slots based on one or more of the example aspects.

30 Claims, 15 Drawing Sheets

TRANSPORT BLOCK TRANSMISSION OVER MULTIPLE TIME SLOTS

FIELD OF TECHNOLOGY

The following relates to wireless communications, including transport block (TB) transmission over multiple time slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, base stations, each supporting wireless communication for communication devices, which may be known as user equipment (UE).

SUMMARY

The described techniques relate to improved methods, systems, devices, and apparatuses that support TB transmission over multiple time slots. For example, a communication device may support wireless communication, including bits of a single TB over one or multiple time slots (e.g., sub-slots, slots, subframes, frames). The communication device may achieve efficient transmission of the bits of the TB by determining a respective starting bit for at least some if not each time slot of the multiple time slots. The determination of each respective starting index for each time slot of the multiple time slots may be performed by the communication device prior to the transmission of the TB (e.g., a transmission of a number of coded bits for a beginning slot of a set of slots). The determination of the respective starting index for each time slot of the multiple time slots may be based on various factors. For example, the communication device may determine a respective starting index for each time slot of the multiple time slots based on one or both of a number of symbols or a number of resource blocks. Additionally or alternatively, the communication device may determine the respective starting index for each time slot based on a redundancy version (RV). The determination of each respective starting bit for each time slot may also be based on a transmission type associated with each time slot (e.g., a slot type, including downlink slot, uplink slot, sidelink slot). In some cases, the communication device may receive a configured grant for the transmission of the TB over the set of time slots. Alternatively, the communication device may scale the TB for transmission over the set of time slots. By enabling the communication device to determine an allocation of bits of TB across multiple time slots, the communication device will experience higher reliability and lower latency of wireless communication by mitigating retransmissions A method for wireless communication is described. The method may include receiving control signaling indicating a resource allocation for a transmission of a TB over a set of time slots, each of one or more time slots of the set of time slots allocated for one or both of uplink or downlink, where the TB includes a payload including a set of coded bits, determining one or more starting indexes of one or more respective subset of coded bits of the set of coded bits based on the resource allocation, each of the one or more respective subset of coded bits for transmission during a respective subset of time slots of the set of time slots, and transmitting the TB over the set of time slots based on the determining.

An apparatus for wireless communication is described. The apparatus may include a processor, memory coupled with the processor, and instructions stored in the memory. The instructions may be executable by the processor to cause the apparatus to receive control signaling indicating a resource allocation for a transmission of a TB over a set of time slots, each of one or more time slots of the set of time slots allocated for one or both of uplink or downlink, where the TB includes a payload including a set of coded bits, determine one or more starting indexes of one or more respective subset of coded bits of the set of coded bits based on the resource allocation, each of the one or more respective subset of coded bits for transmission during a respective subset of time slots of the set of time slots, and transmit the TB over the set of time slots based on the determining.

Another apparatus for wireless communication is described. The apparatus may include means for receiving control signaling indicating a resource allocation for a transmission of a TB over a set of time slots, each of one or more time slots of the set of time slots allocated for one or both of uplink or downlink, where the TB includes a payload including a set of coded bits, means for determining one or more starting indexes of one or more respective subset of coded bits of the set of coded bits based on the resource allocation, each of the one or more respective subset of coded bits for transmission during a respective subset of time slots of the set of time slots, and means for transmitting the TB over the set of time slots based on the determining.

A non-transitory computer-readable medium storing code for wireless communication is described. The code may include instructions executable by a processor to receive control signaling indicating a resource allocation for a transmission of a TB over a set of time slots, each of one or more time slots of the set of time slots allocated for one or both of uplink or downlink, where the TB includes a payload including a set of coded bits, determine one or more starting indexes of one or more respective subset of coded bits of the set of coded bits based on the resource allocation, each of the one or more respective subset of coded bits for transmission during a respective subset of time slots of the set of time slots, and transmit the TB over the set of time slots based on the determining.

Some examples of the method, apparatuses, and non-transitory computer-readable medium described herein may further include operations, features, means, or instructions for determining a respective redundancy version associated with each of the one or more respective subset of coded bits and the respective subset of time slots of the set of time slots and where determining the one or more respective starting indexes of the one or more respective subset of coded bits of the set of coded bits may be further based on the determined respective redundancy version associated with the one or more respective subset of coded bits and the respective subset of time slots of the set of time slots.

Some examples of the method, apparatuses, and non-transitory computer-readable medium described herein may further include operations, features, means, or instructions for enabling the determining of the one or more respective starting indexes of the one or more respective subset of coded bits of the set of coded bits, prior to the transmission of the TB over the set of time slots and where transmitting the TB over the set of time slots may be further based on the enabling.

In some examples of the method, apparatuses, and non-transitory computer-readable medium described herein, each of the one or more time slots of the set of time slots correspond to sub-band full duplex operation, and the sub-band full duplex operation corresponds to one or both of the uplink or the downlink.

Some examples of the method, apparatuses, and non-transitory computer-readable medium described herein may further include operations, features, means, or instructions for determining the one or more respective starting indexes of the one or more respective subset of coded bits of the set of coded bits based on a multiplexing operation associated with each of one or more time slots of the set of time slots, the multiplexing operation corresponding to multiplexing uplink control information over each of the one or more time slots of the set of time slots and where transmitting the TB over the set of time slots may be further based on the multiplexing operation associated with each of the one or more time slots of the set of time slots.

Some examples of the method, apparatuses, and non-transitory computer-readable medium described herein may further include operations, features, means, or instructions for determining the one or more respective starting indexes of the one or more respective subset of coded bits of the set of coded bits independent of a multiplexing operation associated with each of one or more time slots of the set of time slots and where transmitting the TB over the set of time slots may be further independent of the multiplexing operation associated with each of the one or more time slots of the set of time slots.

Some examples of the method, apparatuses, and non-transitory computer-readable medium described herein may further include operations, features, means, or instructions for determining a number of modulation symbols, a number of resource blocks, or any combination thereof, based on the resource allocation and where determining the one or more respective starting indexes of the one or more respective subset of coded bits of the set of coded bits may be further based on the number of modulation symbols, the number of resource blocks, or any combination thereof.

Some examples of the method, apparatuses, and non-transitory computer-readable medium described herein may further include operations, features, means, or instructions for determining a number of resource blocks for each of the one or more time slots of the set of time slots based on the resource allocation, determining that a number of resource blocks available for each of the one or more time slots of the set of time slots may be less than the determined number of resource blocks, and where determining the one or more respective starting indexes of the one or more respective subset of coded bits of the set of coded bits may be further based on determining that the number of resource blocks may be less than the determined number of resource blocks.

Some examples of the method, apparatuses, and non-transitory computer-readable medium described herein may further include operations, features, means, or instructions for determining the one or more respective starting indexes of the one or more respective subset of coded bits of the set of coded bits based on the number of resource blocks.

Some examples of the method, apparatuses, and non-transitory computer-readable medium described herein may further include operations, features, means, or instructions for selecting a first available time slot of the set of time slots for the transmission of the TB over the set of time slots based on the first available time slot being allocated for the uplink and where transmitting the TB over the set of time slots may be further based on the first available time slot being allocated for the uplink.

Some examples of the method, apparatuses, and non-transitory computer-readable medium described herein may further include operations, features, means, or instructions for determining a redundancy version index associated with the transmission of the TB over the set of time slots, determining a first available time slot of the set of time slots being allocated for the uplink based on the redundancy version index, and where transmitting the TB over the set of time slots may be further based on the redundancy version index associated with the transmission of the TB over the set of time slots, the first available time slot of the set of time slots being allocated for the uplink, or both.

Some examples of the method, apparatuses, and non-transitory computer-readable medium described herein may further include operations, features, means, or instructions for updating a respective redundancy version associated with the respective subset of time slots of the set of time slots based on a first time slot corresponding to a first type of time slot different from a second type of time slot associated with a second time slot preceding the first time slot and where determining the one or more respective starting indexes of the one or more respective subset of coded bits of the set of coded bits may be further based on updating the respective redundancy version associated with the respective subset of time slots of the set of time slots.

In some examples of the method, apparatuses, and non-transitory computer-readable medium described herein, the first type of time slot and the second type of time slot correspond to the uplink, or the downlink, or both.

In some examples of the method, apparatuses, and non-transitory computer-readable medium described herein, receiving the control signaling may include operations, features, means, or instructions for receiving a configured grant for the transmission of the TB over the set of time slots and where transmitting the TB over the set of time slots may be further based on the configured grant.

Some examples of the method, apparatuses, and non-transitory computer-readable medium described herein may further include operations, features, means, or instructions for determining a beginning time slot for the transmission of the TB based on the configured grant and where transmitting the TB over the set of time slots may be further based on the beginning time slot.

In some examples of the method, apparatuses, and non-transitory computer-readable medium described herein, the beginning time slot corresponds to the uplink.

In some examples of the method, apparatuses, and non-transitory computer-readable medium described herein, the beginning time slot corresponds toa redundancy version index of zero.

Some examples of the method, apparatuses, and non-transitory computer-readable medium described herein may further include operations, features, means, or instructions for transmitting the TB over the set of time slots may be further based on each of the time slots of the set of time slots corresponding to the uplink.

Some examples of the method, apparatuses, and non-transitory computer-readable medium described herein may further include operations, features, means, or instructions for transmitting the TB over the set of time slots may be further based on each of the time slots of the set of time slots corresponding to full duplex associated with the uplink and the downlink.

Some examples of the method, apparatuses, and non-transitory computer-readable medium described herein may further include operations, features, means, or instructions for scaling a size of the TB based on a first value independent of a second value associated with a number of time slots associated with the set of time slots and where transmitting the TB over the set of time slots may be further based on scaling the size of the TB.

In some examples of the method, apparatuses, and non-transitory computer-readable medium described herein, each time slot associated with both the uplink and the downlink corresponds to a fractional value associated with a value for scaling a size of the TB.

Some examples of the method, apparatuses, and non-transitory computer-readable medium described herein may further include operations, features, means, or instructions for determining a first subset of resource elements for the transmission of the TB over the set of time slots and a second subset of resource elements for multiplexing of uplink control information over the transmission of the TB, where the first subset of resource elements, or the second subset of resource elements, or both correspond to a number of resource elements or a nominal number of resource elements and where transmitting the TB over the set of time slots may be further based on the first subset of resource elements for the transmission of the TB over the set of time slots.

Some examples of the method, apparatuses, and non-transitory computer-readable medium described herein may further include operations, features, means, or instructions for determining the one or more respective starting indexes of the one or more respective subset of coded bits of the set of coded bits may be further based on the number of resource elements or the nominal number of resource elements.

Some examples of the method, apparatuses, and non-transitory computer-readable medium described herein may further include operations, features, means, or instructions for determining a number of resource elements or a nominal number of resource elements associated with the transmission of the TB over the set of time slots based on the resource allocation, determining a transmit power for the transmission of the TB over the set of time slots based on the number of resource elements or the nominal number of resource elements, and where transmitting the TB over the set of time slots may be further based on the transmit power.

In some examples of the method, apparatuses, and non-transitory computer-readable medium described herein, the set of time slots includes a set of slots, and each of one or more slots of the set of slots includes an uplink slot, a downlink slot, or any combination thereof.

In some examples of the method, apparatuses, and non-transitory computer-readable medium described herein, the set of time slots includes a set of slots, and each of one or more slots of the set of slots includes full duplex slot.

In some examples of the method, apparatuses, and non-transitory computer-readable medium described herein, the set of coded bits includes systematic bits, parity bits, or any combination thereof.

A method for wireless communication is described. The method may include receiving control signaling indicating a resource allocation for a transmission of a TB over a set of time slots, each of one or more time slots of the set of time slots allocated for one or both of uplink or downlink, where the TB includes a payload including a set of coded bits, determining one or more respective starting indexes of one or more respective subset of coded bits of the set of coded bits based on the resource allocation, each of the one or more respective subset of coded bits for transmission during a respective subset of time slots of the set of time slots, and transmitting the TB over the set of time slots based on the determining.

An apparatus for wireless communication is described. The apparatus may include a processor, memory coupled with the processor, and instructions stored in the memory. The instructions may be executable by the processor to cause the apparatus to receive control signaling indicating a resource allocation for a transmission of a TB over a set of time slots, each of one or more time slots of the set of time slots allocated for one or both of uplink or downlink, where the TB includes a payload including a set of coded bits, determine one or more respective starting indexes of one or more respective subset of coded bits of the set of coded bits based on the resource allocation, each of the one or more respective subset of coded bits for transmission during a respective subset of time slots of the set of time slots, and transmit the TB over the set of time slots based on the determining.

Another apparatus for wireless communication is described. The apparatus may include means for receiving control signaling indicating a resource allocation for a transmission of a TB over a set of time slots, each of one or more time slots of the set of time slots allocated for one or both of uplink or downlink, where the TB includes a payload including a set of coded bits, means for determining one or more respective starting indexes of one or more respective subset of coded bits of the set of coded bits based on the resource allocation, each of the one or more respective subset of coded bits for transmission during a respective subset of time slots of the set of time slots, and means for transmitting the TB over the set of time slots based on the determining.

A non-transitory computer-readable medium storing code for wireless communication is described. The code may include instructions executable by a processor to receive control signaling indicating a resource allocation for a transmission of a TB over a set of time slots, each of one or more time slots of the set of time slots allocated for one or both of uplink or downlink, where the TB includes a payload including a set of coded bits, determine one or more respective starting indexes of one or more respective subset of coded bits of the set of coded bits based on the resource allocation, each of the one or more respective subset of coded bits for transmission during a respective subset of time slots of the set of time slots, and transmit the TB over the set of time slots based on the determining.

A method for wireless communications is described. The method may include receiving control signaling indicating a resource allocation for a transmission of a TB over a set of time slots, each of one or more time slots of the set of time slots allocated for one or both of uplink or downlink, where the TB includes a payload including a set of coded bits, determining one or more respective starting index of one or more respective subset of coded bits of the set of coded bits based on the resource allocation, each of the one or more respective subset of coded bits for transmission during a respective subset of time slots of the set of time slots, and transmitting the TB over the set of time slots based on the determination.

An apparatus for wireless communications is described. The apparatus may include a processor, memory coupled with the processor, and instructions stored in the memory. The instructions may be executable by the processor to cause the apparatus to receive control signaling indicating a resource allocation for a transmission of a TB over a set of time slots, each of one or more time slots of the set of time slots allocated for one or both of uplink or downlink, where the TB includes a payload including a set of coded bits, determine one or more respective starting index of one or more respective subset of coded bits of the set of coded bits based on the resource allocation, each of the one or more respective subset of coded bits for transmission during a respective subset of time slots of the set of time slots, and transmit the TB over the set of time slots based on the determination.

Another apparatus for wireless communications is described. The apparatus may include means for receiving control signaling indicating a resource allocation for a transmission of a TB over a set of time slots, each of one or more time slots of the set of time slots allocated for one or both of uplink or downlink, where the TB includes a payload including a set of coded bits, means for determining one or more respective starting index of one or more respective subset of coded bits of the set of coded bits based on the resource allocation, each of the one or more respective subset of coded bits for transmission during a respective subset of time slots of the set of time slots, and means for transmitting the TB over the set of time slots based on the determination.

A non-transitory computer-readable medium storing code for wireless communications is described. The code may include instructions executable by a processor to receive control signaling indicating a resource allocation for a transmission of a TB over a set of time slots, each of one or more time slots of the set of time slots allocated for one or both of uplink or downlink, where the TB includes a payload including a set of coded bits, determine one or more respective starting index of one or more respective subset of coded bits of the set of coded bits based on the resource allocation, each of the one or more respective subset of coded bits for transmission during a respective subset of time slots of the set of time slots, and transmit the TB over the set of time slots based on the determination.

DETAILED DESCRIPTION

Figure 1:
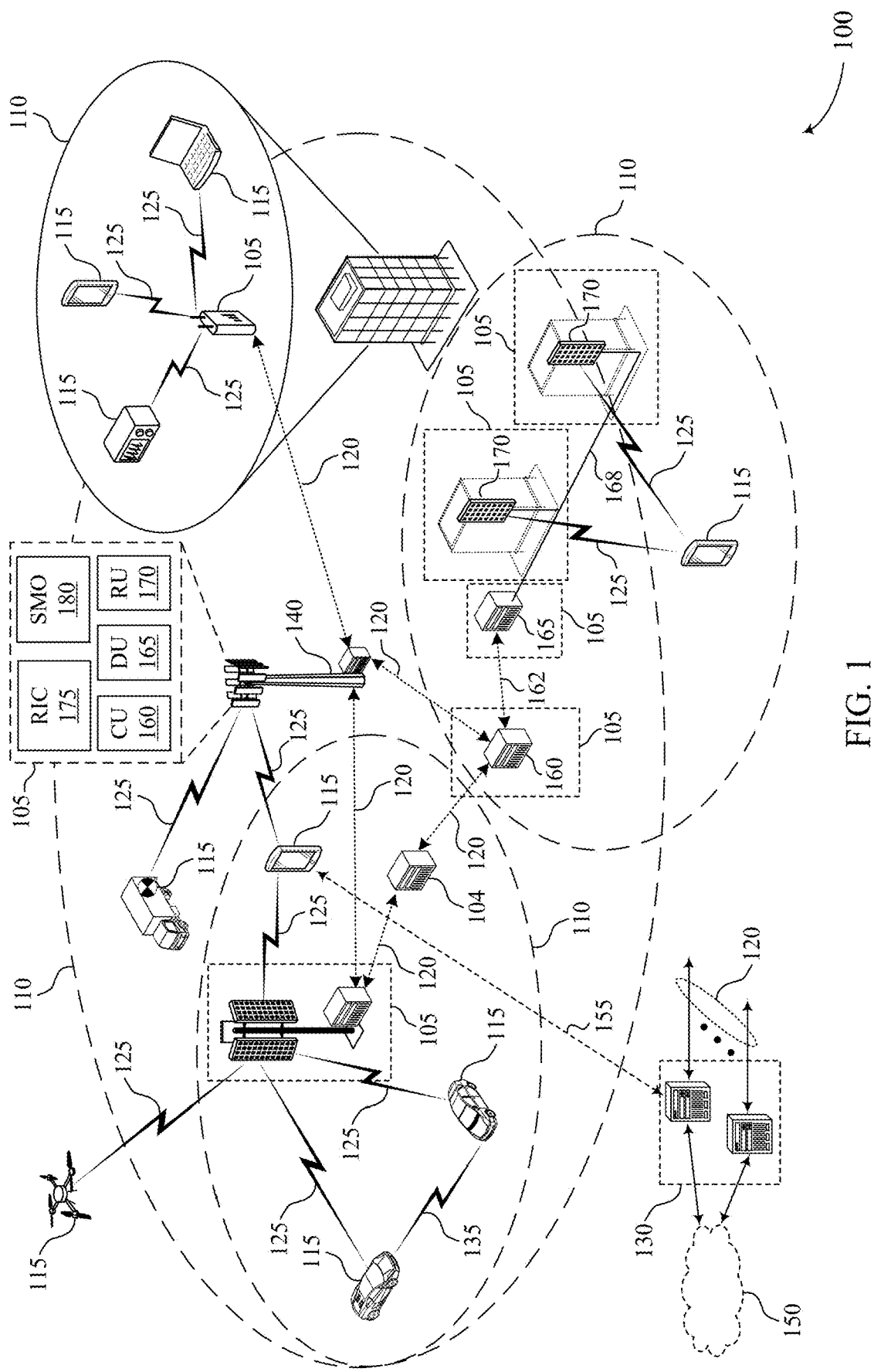
FIGS. 1 and 2 illustrate examples of wireless communications systems that support TB transmission over multiple time slots in accordance with one or more aspects of the present disclosure.

A wireless communications system may include a communication device, such as a UE or a network entity (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, and 5G systems, which may be referred to as NR systems. The wireless communications may include uplink transmission, uplink reception, downlink transmission, or downlink reception, sidelink transmission, sidelink reception, or a combination thereof. A communication device may support wireless communications over multiple time and frequency resources (e.g., sub-slots, slots, subframes, frames, sub-carriers, carriers). By way of example, a network entity may support downlink transmission and uplink reception over one or multiple time slots (e.g., sub-slots, slots, subframes, frames). Likewise, a UE may support downlink reception, uplink transmission, sidelink transmission, sidelink reception, or a combination thereof, over one or multiple time slots (e.g., sub-slots, slots, subframes, frames). A communication device may transmit or receive a TB over one or multiple time slots (e.g., sub-slots, slots, subframes, frames). A unit of data may be referred to as a TB, which may include a number of bits associated with downlink data, uplink data, sidelink data, or a combination thereof.

The communication device may support transmission of a TB over multiple time slots (e.g., multiple slots also referred to as TBoMS) based on a resource allocation of time and frequency resources (e.g., sub-slots, slots, subframes, frames, sub-carriers, carriers, physical resource blocks (PRBs)). In some cases, the resource allocation may include a same number of resources (e.g., symbols, subcarriers) in each time slot of the multiple time slots, and each time slot may correspond to the same transmission type (e.g., uplink, downlink, sidelink). In these cases, the communication device may allocate transmission of a number of coded bits of the TB across the multiple time slots with less complexity. For example, the communication device may transmit the number of coded bits of the TB equally across the time slots. However, in some other cases, the resource allocation may include a different number of resources (e.g., symbols, subcarriers), or one or more of the time slots might correspond to a different transmission type (e.g., a combination of uplink and downlink). In this case, the allocation and transmission of the number of coded bits across the multiple time slots becomes more complex for the communication device.

In some cases, the communication device may be unable to adjust the number of coded bits allocated to each time slot for a multi time slot transmission of a single TB. The failure of the communication device to manage (e.g., adjust, modify, control) the number of coded bits allocated to each time slot for the multi time slot transmission of the single TB when different time slots have different allocated resource (e.g., for different transmission types) may result in a loss of data (e.g., loss of bits) and inefficient utilization of resources (e.g., increased overhead, such as resources that are not used), increased latency, and reduced communication quality for the communication device. In order to preserve all data (e.g., bits) of the TB, the communication device may determine a starting bit for at least some if not each time slot (e.g., the first bit of a set of bits to be transmitted during each time slot) and perform per-time slot rate matching in order to transmit the entire TB across multiple time slots. The communication device will effectively transmit the TB over the multiple time slots based on the determined starting bits.

By enabling the communication device to determine starting bit for each time slot and allocation of bits of TB across multiple time slots, the communication device will experience higher reliability and lower latency of wireless communication by mitigating retransmissions. Additionally, by enabling the communication device to determine starting bit for each time slot and allocation of bits of TB across multiple time slots, the communication device will experience power saving by avoiding retransmission of data (e.g., lossy bits).

Aspects of the disclosure are initially described in the context of wireless communications systems. Examples of TBoMS messaging and rate matching are also described. Aspects of the disclosure are further illustrated by and described with reference to apparatus diagrams, system diagrams, and flowcharts that relate to TB transmission over multiple time slots.

FIG. 1 illustrates an example of a wireless communications system 100 that supports TB transmission over multiple time slots in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170).

In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support TB transmission over multiple time slots as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and Ne may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a time slot. In some examples, the time slot duration (e.g., a quantity of symbol periods in a time slot) may be variable. Additionally, or alternatively, the smallest scheduling unit of the wireless communications system 100 may be dynamically selected (e.g., in bursts of shortened time slots).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100, one or more of a network entity 105, a base station 140, or a UE 115 may support wireless communication over a wireless channel within a geographic coverage area 110. For example, one or more of the network entity 105, the base station 140, or the UE 115 may support one or both of transmission or reception of one or multiple TBs. In some examples, one or more of the network entity 105, the base station 140, or the UE 115 may support one or both of transmission or reception of a TB using time and frequency resources, which may include one or more of sub-slots, slots, subframes, frames, sub-carriers, carriers. One or both of a network entity 105 or a base station 140 may transmit (e.g., output), and a UE 115 may receive, control signaling. In some cases, the control signaling may indicate a configured grant (e.g., a multi-time slot grant) indicating a set of slots (e.g., time slots) for transmission or reception of a TB. One or more of the network entity 105, the base station 140, or the UE 115 may, based on a resource allocation indicated in the grant, support the transmission or reception of a TB, which may carry uplink data, downlink data, or some combination thereof. For example, during multiple slots, the network entity 105 or the base station 140 may transmit, and the UE 115 may receive, a TB over the multiple slots. Additionally or alternatively, during multiple slots, the UE 115 may transmit, and the network entity 105 or the base station 140, ay receive a TB over the multiple slots.

One or more of the network entity 105, the base station 140, or the UE 115 may achieve efficient transmission of bits of a TB by determining a respective starting bit for each time slot of the set of time slots. The determination of each respective starting bit for each time slot of the set time slots may be performed by one or more of the network entity 105, the base station 140, or the UE 115 prior to the transmission of the TB (e.g., a transmission of a number of coded bits for a beginning slot of a set of slots). The determination of the respective starting bit for each time slot of the multiple time slot may be based on various factors. For example, one or more of the network entity 105, the base station 140, or the UE 115 may determine a respective starting bit for each time slot of the multiple time slots based on one or both of a number of symbols or a number of resource blocks, which may be indicated to the communication device in a grant scheduling the multiple time slots.

Additionally or alternatively, one or more of the network entity 105, the base station 140, or the UE 115 may determine the respective starting bit for each time slot based on a RV, which may be indicative of a starting index for the entire subset of time slots. The determination of each respective starting bit for each time slot may also be based on a transmission type associated with each time slot (e.g., a slot type, including downlink slot, uplink slot, sidelink slot). By enabling one or more of the network entity 105, the base station 140, or the UE 115 to determine a starting bit for each time slot and allocation of bits of TB across multiple time slots, one or more of the network entity 105, the base station 140, or the UE 115 will experience higher reliability and lower latency of wireless communication.

Figure 2:
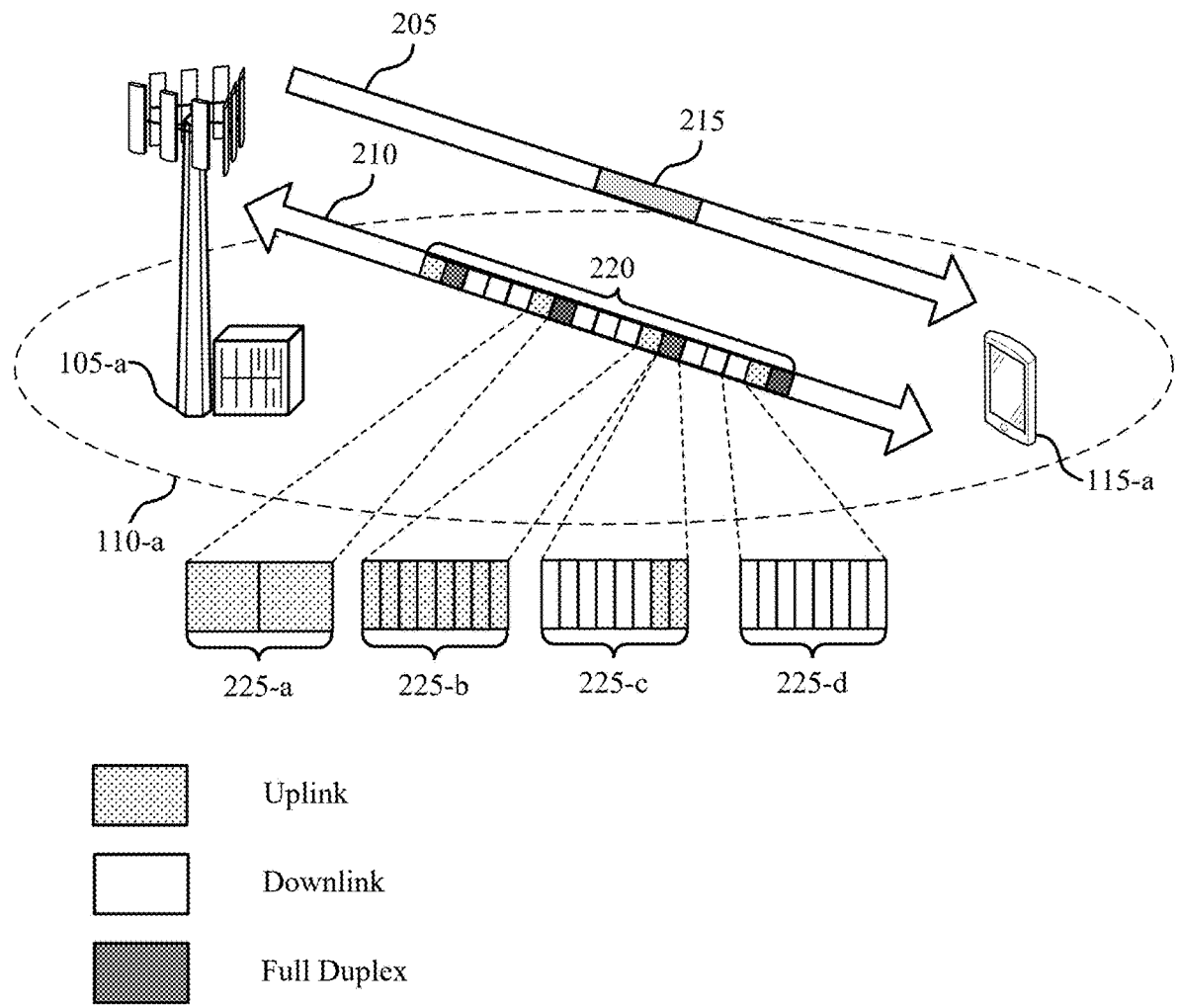

FIG. 2 illustrates an example of a wireless communications system 200 that supports TB transmission over multiple time slots in accordance with one or more aspects of the present disclosure. The wireless communications system 200 may implement or be implemented by aspects of the wireless communications system 100 as described in FIG. 1. For example, the wireless communications system 200 may include a network entity 105-a and a UE 115-a, which may be examples of a network entity 105 and a UE 115 as described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support power saving, and, in some examples, may promote high reliability and low latency wireless communications. In the following description of the wireless communications system 200, the operations between the network entity 105-a and the UE 115-a may be transmitted or performed in different orders or at different times. Some operations or components may also be omitted from the wireless communications system 200, or other operations or components may be added to the wireless communications system 200.

One or more of the network entity 105-a or the UE 115-a may be equipped with multiple antennas, which may be used to employ techniques as described with reference to FIG. 1. The antennas of the network entity 105-a or the UE 115-a may be located within one or more antenna arrays or antenna panels, which may support operations as described herein. The network entity 105-a may have an antenna array with a number of rows and columns of antenna ports that the network entity 105-a may use to support wireless communications with the UE 115-a. Likewise, the UE 115-a may have one or more antenna arrays that may support various operations as described herein. Additionally or alternatively, the UE 115-a may have an antenna array with a number of rows and columns of antenna ports that the UE 115-a may use to support wireless communications with the network entity 105-a.

In the example of FIG. FIG. 2, the network entity 105-a may perform wireless communication with the UE 115-a within a geographic coverage area 110-a. For example, the network entity 105-a and the UE 115-a may communicate a TB using a bi-directional communications link 210. In some examples, the TB may be associated with time and frequency resources. For example, the time and frequency resources may include a system bandwidth allocated into time slots 225, in which the network entity 105-a and the UE 115-a may support transmission and reception of a TB. Each of one or more time slots of the time slots 225 may represent sub-slots, slots, subframes, or frame.

The network entity 105-a may provide control signaling, such as a grant 215 (e.g., a multi-time slot grant), of a time slot set 220 including multiple consecutive time slots 225 to the UE 115-a over a communication link 205. The network entity 105-a and the UE 115-a may use the time and frequency resources associated with each of the multiple consecutive time slots 225 for communication of uplink data, downlink data, or some combination thereof. For example, during one or more downlink time slots 225 (e.g., a time slot 225-d) the network entity 105-a may transmit data and the UE 115-a may receive data. Additionally or alternatively, during one or more uplink time slots 225 (e.g., a time slot 225-a and a time slot 225-b), the UE 115-a may transmit data and the network entity 105-a may receive data. In some examples, one or more time slots may be a full duplex time slot (e.g., a time slot 225-c) and may support both uplink and downlink during the full duplex time slot.

In some cases, the network entity 105-a may indicate a number of time slots of the time slot set 220 (e.g., the number of time slots 225 in the time slot set 220) or other time slot metrics to the UE 115-a. In some examples, the network entity 105-a may indicate the time slot information in the grant 215 (e.g., in a downlink control information (DCI)), rather than via RRC signaling. In some examples, the time slot information (e.g., time slot duration) may be indicated using a combination of RRC and DCI signaling, where RRC signaling may be used to indicate the number of time slots to be potentially included in the grant 215 and the grant 215 can indicate the specific time slots 225 that are scheduled in the grant 215. Additionally or alternatively, the grant 215 may indicate the number of resources (e.g., symbols, subcarriers, PRBs, or the like) for each time slot 225.

In some examples, each time slot 225 of the time slot set 220 may include the same number of resources (e.g., Type A time domain resource allocation (TDRA)). Alternatively, one or more time slots 225 of the time slot set 220 may include a different number of resources than other time slots 225 of the same time slot set 220 (e.g., sub-band full duplex (SBFD)). For example, an uplink time slot 225-a may include two symbols and an uplink time slot 225-b may include eight symbols. In some examples, the number of resources for each time slot 225 may be based on the time slot type (e.g., uplink, downlink, or full duplex). For example, a full duplex time slot 225-c may support both uplink and downlink transmissions and allocate one or more of the available resources to uplink and downlink, respectively. That is, the full duplex time slot 225-a may have fewer uplink resources (e.g., two symbols) than an uplink time slot 225-b (e.g., eight symbols). A downlink time slot, such as time slot 225-d, may only support downlink transmissions and allocate all available resources to downlink and have no uplink resources.

In some cases, the UE 115-a may allocate and transmit a number of coded bits (e.g., carried by a TB) across the time slot set 220 based at least in part on the resource allocation of the time slots 225. For example, a time slot set 220 with the same number of resources in each time slot 225 may enable the allocation and transmission of the same number of coded bits per time slot 225. However, a time slot set 220 with a different number of resources for one or more time slot 225 may enable coded bit allocation and transmission using a per-time slot rate matching technique. The UE 115-a may transmit the TB during one or more time slots 225 (e.g., uplink, full duplex, or some combination thereof) of the time slot set 220 to the network entity 105-a. In some cases, the UE 115-a may simultaneously receive transmissions during one or more time slots 225 (e.g., downlink, full duplex, or some combination thereof) of the time slot set 220 from the network entity 105-a.

Figure 3A:
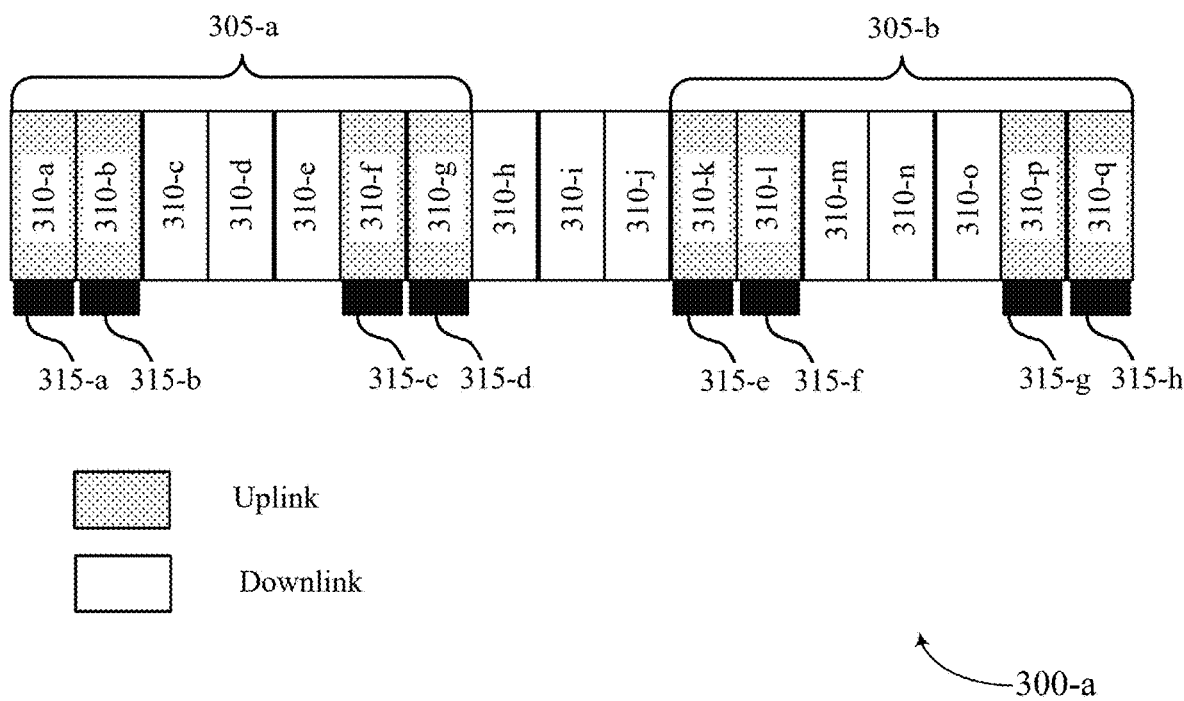
FIG. 3A illustrates an example of a bi-directional transmission that supports TB transmission over multiple time slots in accordance with one or more aspects of the present disclosure.

FIG. 3A illustrates an example of a bi-directional transmission 300-a that supports TB transmission over multiple time slots in accordance with one or more aspects of the present disclosure. In some examples, the bi-directional transmission 300-a may implement or be implemented by aspects of the wireless communications system 100 or wireless communications system 200, as described with reference to FIGS. 1 and 2, respectively. For example, the bi-directional transmission 300-a may be implemented by a network entity 105, a base station 140, and a UE 115, which may be an example of a network entity 105, a base station 140, and a UE 115 as described with reference to FIGS. 1 and 2, respectively. In the following description of the bi-directional transmission 300-a, the operations between a network entity 105, a base station 140, and UE 115 may be transmitted or performed in different orders or at different times. Some operations or components may also be omitted from the bi-directional transmission 300-a, or other operations or components may be added to the bi-directional transmission 300-a.

The bi-directional transmission 300-a may occur over a bi-directional communications link (e.g., between one or more of a network entity 105, a base station 140, or a UE 115). In some cases, the bi-directional transmission 300-a may occur over a set of time slots, which may include two or more consecutive time slots 310. For example, the set of time slots may include one or more uplink time slots 310 (e.g., time slot 310-b, time slot 310-g, time slot 310-l, and time slot 310-q), downlink time slots (e.g., time slot 310-c, time slot 310-d, time slot 310-e, time slot 310-h, time slot 310-i, time slot 310-j, time slot 310-m, time slot 310-n, and time slot 310-o), or some combination thereof.

A UE 115 may transmit a TB 315 over one or more time slots 310 of the set of time slots. For example, a UE 115 may transmit a TB over one or more uplink time slots (e.g., the time slot 310-a, the time slot 310-b, the time slot 310-f, the time slot 310-g, the time slot 310-k, the time slot 310-l, the time slot 310-p, and the time slot 310-q). In some examples, the TB 315 may be transmitted in portions (e.g., a first portion 315-a, a second portion 315-b, a third portion 315-c, a fourth portion 315-d, a fifth portion 315-e, a sixth portion 315-f, a seventh portion 315-g, and an eighth portion 315-h), and each portion 315 may be transmitted during a respective time slot 310. For example, the first portion 315-a may be transmitted during the time slot 310-a, the second portion 315-b may be transmitted during the time slot 310-b, and so on.

In some cases, the TB 315 may include a payload, which may carry a number of coded bits. In some examples, each portion 315 may have one or more associated bits of the total number of coded bits. In some cases, the number of associated bits for each portion 315 may be based on the resource allocation across the time slots 310. For example, the resource allocation may include the same number of resources (e.g., symbols, subcarriers) in each uplink time slot 310 of the set of time slots. In this case, the same number of coded bits may be transmitted across each uplink time slot 310.

In some cases, one or more of the time slots 310 may be associated with an RV bundle or repetition (e.g., configured by an RV index). For example, a first RV bundle 305-a (e.g., RV0 index) may include a first subset of time slots 310 (e.g., the time slot 310-a, the time slot 310-b, the time slot 310-c, the time slot 310-d, the time slot 310-e, the time slot 310-f, and the time slot 310-g). Additionally, a second RV bundle 305-b (e.g., RV2 index) may include a second subset of time slots 310 (e.g., the time slot 310-k, the time slot 310-l, the time slot 310-m, the time slot 310-n, the time slot 310-o, the time slot 310-p, and the time slot 310-q). In some cases, the RV bundles 305 may be associated with one or more bits of the TB 315. For example, each uplink time slot 310 may have one or more associated bits of the total number of coded bits of the TB 315, and the one or more associated bits may be based on the RV index associated with each respective slot.

In some cases, one or more bits associated with the first RV bundle 305-a may be associated with the second RV bundle 305-b. For example, the bits of RV bundle 305-b may be a retransmission or a redundant transmission of the bits transmitted in RV bundle 305-a. In some examples, the bits may be transmitted in a different order between the RV bundle 305-a and the RV bundle 305-b. For example, the bits associated with the time slot 310-a, and consequently the first portion 315-a of RV bundle 305-a may be retransmitted and associated with the third uplink time slot 310-*p*, and consequently the portion 315-*g* of RV bundle 305-*b*.

The UE 115 may determine how to transmit the coded bits over varied time slots in order to preserve the TB. For example, the UE 115 may determine a starting bit for each time slot (e.g., the first bit of a set of bits to be transmitted during each time slot 310) and perform per-time slot rate matching in order to transmit the complete TB 315 across multiple time slots 310. In some cases, the UE 115 may determine a respective starting coded bit for each time slot based on a number of resources allocated to each time slot, which may be indicated by the grant. For example, for SBFD operation, the starting bit for each slot may be predetermined prior to the start of the TBoMS.

In some cases, the UE 115 may determine the starting coded bit based on the number of resources (e.g., symbols, resource blocks, and the like) of the respective time slot 310. For example, the UE may determine the starting coded bit based on the resources indicated in the grant. Additionally or alternatively, the UE 115 may determine the starting coded bit based on the number of resources (e.g., resource blocks) available in an SBFD slot being less than the number of resources indicated in the grant. In such an example, the UE may use the actual number of available resources per time slot 310.

In some cases, the UE 115 may determine the starting coded bit based on the bit type. For example, the UE 115 may determine to transmit all of the systematic bits of the coded bits. In such an example, the UE 115 may start the TBoMS at an uplink slot to ensure that all systematic bits are transmitted. In some examples, the first available time slot 310 for TBoMS may always be an uplink slot. Additionally or alternatively, if the RV index associated with the TBoMS is RV0, the first available time slot 310 may be an uplink slot. In some cases, the RV index may be refreshed when the transmission switches between uplink and downlink (e.g., goes from a downlink time slot 310 to an uplink time slot 310, or goes from an uplink time slot 310 to a downlink time slot 310). Alternatively, the RV index may be refreshed when the transmission switches between a full duplex time slot 310 and an uplink time slot 310 (e.g., goes from a full duplex time slot 310 to an uplink time slot 310, or goes from an uplink time slot 310 to a full duplex time slot 310).

In some cases, when the set of consecutive time slots include a mix of uplink time slots 310 and full duplex time slots 310, the UE 115 may use the full duplex time slots 310 as available time slots 310. In some examples, the starting coded bit may always be an uplink slot associated with a particular RV index (e.g., RV0). In some other examples, the starting coded bit may be the first slot (e.g., uplink or full duplex) associated a particular RV index (e.g., RV0). In some cases the UE 115 may not use mixed mode operation for TBoMS. For example, the UE 115 may only use uplink time slots 310, or may only use full duplex time slots 310. In such an example, the first available time slot 310 may be based on the time slot type selected by the UE 115.

In some cases, the UE 115 may determine the starting coded bit based on uplink control information (UCI) multiplexing. In some examples, UCI multiplexing may be considered for a subset of the time slots (e.g., only the first time slot). For UCI multiplexing over the TBoMS, the UE 115 may use the actual or nominal resources available for the TBoMS in order to compute the number of resources needed for the UCI. For example, the index of the starting coded bit ($s_k$) for a given slot (e.g., k) may be given a value where $s_k = s_{k-1} + \text{offset}_{k-1}$. Additionally, $\text{offset}_{k-1} = N_{RE}^{k-1} * q * L * (1 - \alpha_{k-1})$, or $\text{offset}_{k-1} = N_{RE}^{k-1} * q * L - G_{k-1}^{ACK} - G_{k-1}^{CSI-part1} - G_{k-1}^{CSI-part2} - G_{k-1}^{CG-UCI}$ where $s_1$ is set to the index of the starting bit of the RV index associated with a single TBoMS transmission. In such an example, $G_{k-1}^x$ denotes the resources used for each component of UCI. Additionally, $N_{RE}^{k-1}$ indicates the number of actual or nominal resources in a slot.

In some cases, the UE 115 may use the actual or nominal resources available for the TBoMS in order to compute a transmit power. In some examples, the transmit power may be computed in order to calculate the bits per resource element (BPRE). For example, a BPRE for TBoMS may be calculated as $\text{BPRE} = \Sigma K_r / (N_{RE} * N)$, where N is the number of slots allocated for a single TBoMS and $N_{RE}$ is the actual or nominal resources in one allocation slot of a single TBoMS.

Figure 3B:
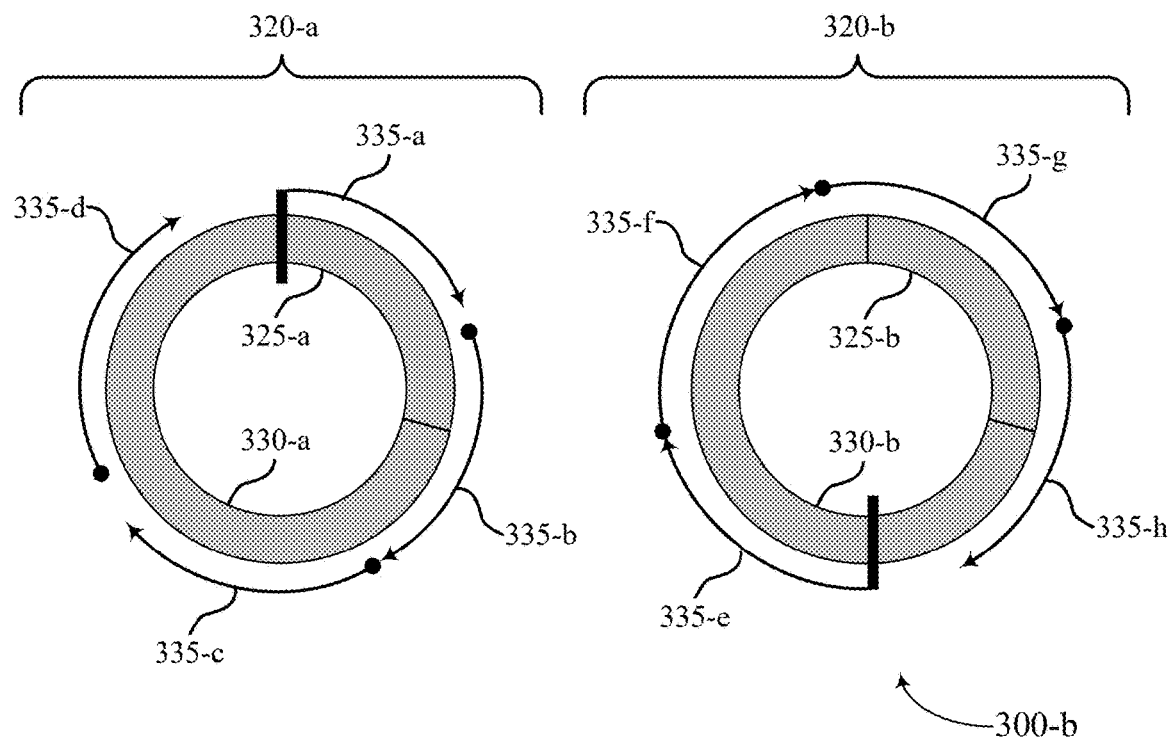
FIG. 3B illustrates an example of a circular buffer that supports TB transmission over multiple time slots in accordance with one or more aspects of the present disclosure.

FIG. 3B illustrates an example of a circular buffer 300-*b* that supports TB transmission over multiple time slots in accordance with one or more aspects of the present disclosure. The circular buffer 300-*b* may implement or be implemented by aspects of the bi-directional transmission 300-*a* as described with reference to FIG. 3A. Additionally, the circular buffer 300-*b* may implement or be implemented by aspects of the wireless communications system 100 or wireless communications system 200, as described with reference to FIGS. 1 and 2, respectively. For example, the circular buffer 300-*b* may be implemented by a network entity 105, a base station 140, and a UE 115, which may be an example of a network entity 105, a base station 140, and a UE 115 as described with reference to FIGS. 1 and 2, respectively. In the following description of the circular buffer 300-*b*, the operations between a network entity 105, a base station 140, and UE 115 may be transmitted or performed in different orders or at different times. Some operations or components may also be omitted from the circular buffer 300-*b*, or other operations or components may be added to the circular buffer 300-*b*.

Figure 4A:
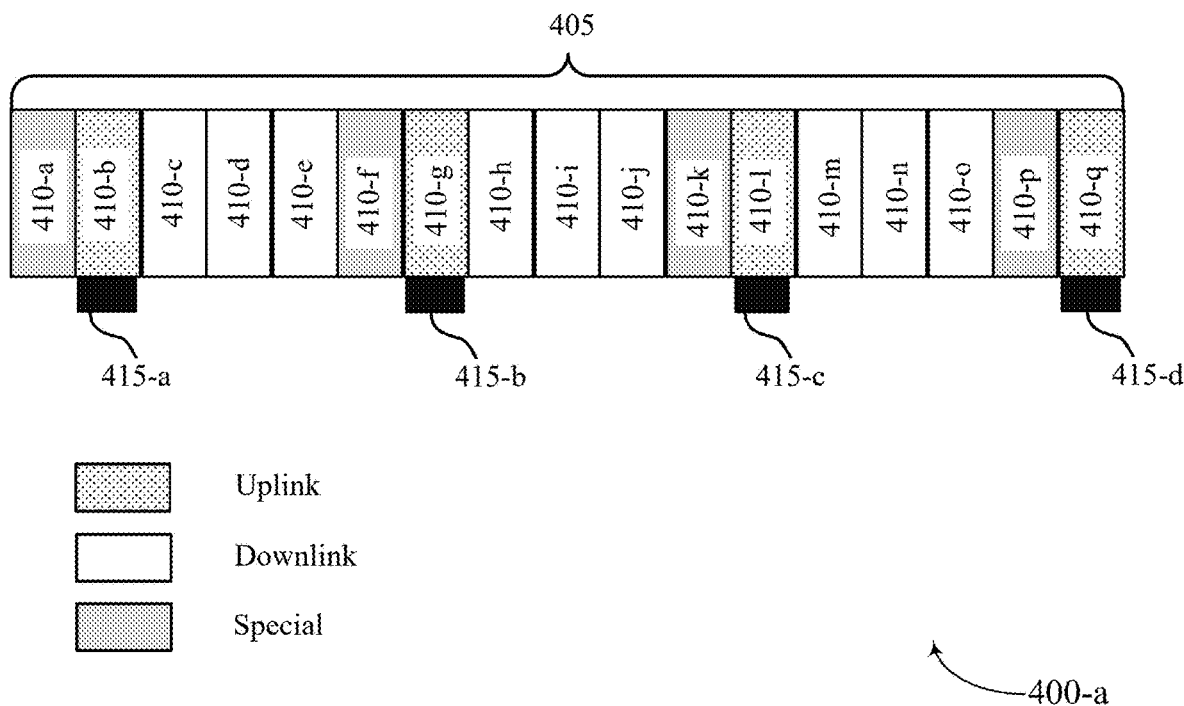
FIG. 4A illustrates an example of a bi-directional transmission that supports TB transmission over multiple time slots in accordance with one or more aspects of the present disclosure.
Figure 4B:
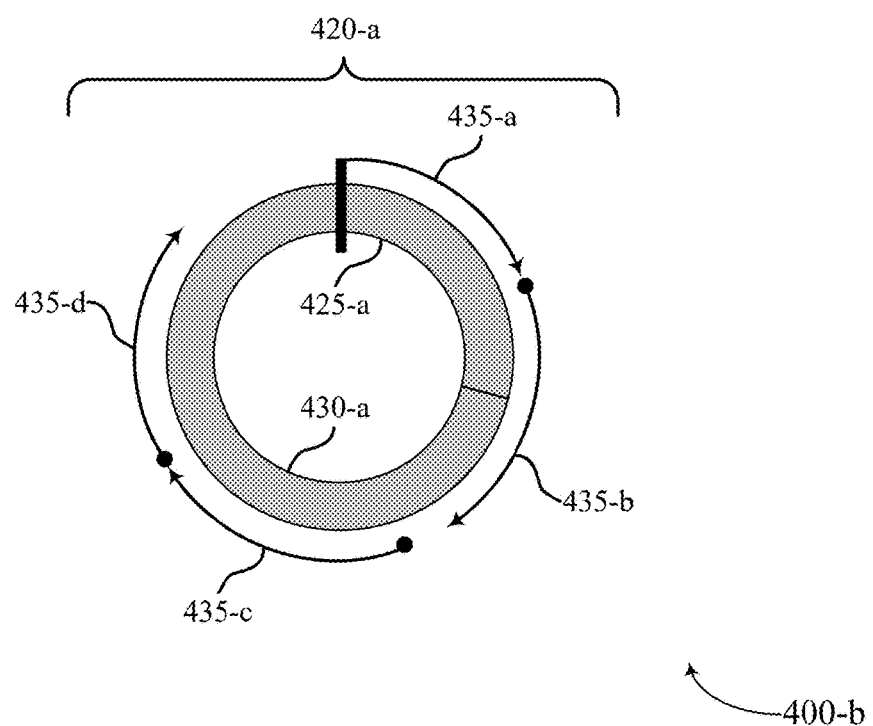
FIG. 4B illustrates an example of a circular buffer that supports TB transmission over multiple time slots in accordance with one or more aspects of the present disclosure.

In the example of FIG. 4B, operation of the circular buffer 300-*b* may be implemented by a network entity 105, a base station 140, and a UE 115 may be based on a respective RV bundle, a repetition of bits, or an index, or a combination thereof. For example, an RV 320-*a* may be an example of an index type RV0 and an RV 320-*b* may be an example of an index type RV2, each of which may have a preconfigured handling of bits of for a TB 315. One or more bits of the RVs 320 may be systematic bits (e.g., 325-*a* and 325-*b*) which may also be referred to as a copy of a TB payload bits. Additionally, one or more other bits of the RVs 320 may be encoded bits of the TB (e.g., 330-*a* and 330-*b*), which may also be referred to as parity bits. The encoded bits 330 may be linearly derived from the systematic bits 325 and appended to the systematic bits 325. In some cases, a network entity 105, a base station 140, and a UE 115 may use the encoded bits 330 to determine the systematic bits 325.

Each RV 320 may include multiple sets of bits of the TB 315 bits. For example, the RV 320-*a* may include four segments (e.g., a first segment 335-*a*, a second segment 335-*b*, a third segment 335-*c*, and a fourth segment 335-*d*), and the RV 320-*b* may include four segments (e.g., a first segment 335-*e*, a second segment 335-*f*, a third segment 335-*g*, and a fourth segment 335-*h*) each associated with a respective set of bits (e.g., bits associated with TB portions including a first portion 315-*a*, a second portion 315-*b*, a third portion 315-*c*, a fourth portion 315-*d*, a fifth portion 315-*e*, a sixth portion 315-*f*, a seventh portion 315-*g*, or an eighth portion 315-*h*, with reference to FIG. 3A).

Each segment 335 may be associated with a time slot for TBoMS. For example, with reference to FIG. 3A, the first segment 335-*a* may be associated with a first time slot 310-*a*, the second segment 335-*b* may be associated with a second time slot 310-*b*, the third segment 335-*c* may be associated with a third time slot 310-*f*, and the fourth segment 335-*d* may be associated with a fourth time slot 310-*g*. Bits for each time slot 310 may be configured or handled within a respective segment 335. For example, bits of the first portion 315-*a*, transmitted during the first time slot 310-*a*, may be handled by the first segment 335-*a*. In some cases, bits handled by the RV 320-*a* may be the same as the bits handled by the RV 320-*b*. For example, the bits handled by the RV 320-*b* may be a retransmission or a new transmission of the bits handled by the RV 320-*a*. In such an example, the bits of each RV 320 may be the same, but shifted to align with different segments 335. For example, one or more bits associated with the first segment 335-*a* of the RV 320-*a* (e.g., bits for a first time slot) may also be associated with the third segment 335-*g* of the RV 320-*b* (e.g., bits for a third time slot).

In some cases, there may be bits of the TB 315 which are not associated with a respective segment 335 or time slot 310. For example, gaps may occur between one or more segments 335 (e.g., due to UCI multiplexing). In some cases, the starting point of each segment 335 may be precomputed or preconfigured. In some examples, the starting point of each segment 335 may indicate the starting bit of each respective time slot 310. For example, using the starting point of each segment 335, or the starting bit of each associated time slot 310, a network entity 105, a base station 140, and a UE 115 may determine the remaining bits of the respective time slot 310.

FIG. 4A illustrates an example of a bi-directional transmission 400-*a* that supports TB transmission over multiple time slots in accordance with one or more aspects of the present disclosure. In some examples, the bi-directional transmission 400-*a* may implement or be implemented by aspects of the wireless communications system 100 or wireless communications system 200, as described with reference to FIGS. 1 and 2, respectively. For example, the bi-directional transmission 400-*a* may be implemented by a network entity 105, a base station 140, and a UE 115, which may be an example of a network entity 105, a base station 140, and a UE 115 as described with reference to FIGS. 1 and 2, respectively. In the following description of the bi-directional transmission 400-*a*, the operations between a network entity 105, a base station 140, and UE 115 may be transmitted or performed in different orders or at different times. Some operations or components may also be omitted from the bi-directional transmission 400-*a*, or other operations or components may be added to the bi-directional transmission 400-*a*.

The bi-directional transmission 400-*a* may occur over a bi-directional communications link (e.g., between one or more of a network entity 105, a base station 140, or a UE 115). In some cases, the bi-directional transmission 400-*a* may occur over a set of time slots, which may include two or more consecutive time slots 410. For example, the set of time slots may include one or more uplink time slots 410 (e.g., time slot 410-*b*, time slot 410-*g*, time slot 410-*l*, and time slot 410-*q*), downlink time slots (e.g., time slot 410-*c*, time slot 410-*d*, time slot 410-*e*, time slot 410-*h*, time slot 410-*i*, time slot 410-*j*, time slot 410-*m*, time slot 410-*n*, and time slot 410-0), or some combination thereof. In some examples, the set of time slots may include one or more special time slots, which may include a time slot 410-*a*, a time slot 410-*f*, a time slot 410-*k*, and a time slot 410-*p*. A special time slot may be allocated for one or both of downlink or uplink.

A UE 115 may transmit a TB 415 over one or multiple time slots 410 allocated for uplink. For example, a UE 115 may transmit a TB over one or multiple uplink time slots (e.g., the time slot 410-*b*, the time slot 410-*g*, the time slot 410-*l*, and/or the time slot 410-*q*). In some examples, the UE 115-*b* may transmit the TB 415 in portions (e.g., a first portion 415-*a*, a second portion 415-*b*, a third portion 415-*c*, and a fourth portion 415-*d*), and each portion 415 may be transmitted by the UE 115 during a respective time slot 410. For example, the first portion 415-*a* may be transmitted during the time slot 410-*b*, the second portion 415-*b* may be transmitted during the time slot 410-*g*, and so on.

In some cases, the TB 415 may include a payload, which may carry a number of coded bits. In some examples, each portion 415 of the TB 415 may have one or more associated bits of the total number of coded bits. In some cases, the number of associated bits for each portion 415 may be based on a resource allocation associated with the time slots 410. For example, the resource allocation may include the same number of resources (e.g., symbols, subcarriers) in each time slot 410 allocated for uplink of the set of time slots. In this case, the same number of coded bits may be transmitted across each time slot 410 allocated for uplink.

In some cases, one or more of the time slots 410 may be associated with an RV bundle or repetition (e.g., configured by an RV index). For example, an RV bundle 405 (e.g., RV0 index) may include all of the time slots 410. In some cases, the RV bundle 405 may be associated with one or more bits of the TB 415. For example, each uplink time slot 410 may have one or more associated bits of the total number of coded bits of the TB 415, and the one or more associated bits may be based on the RV index associated with each respective slot.

FIG. 4B illustrates an example of a circular buffer 400-*b* that supports TB transmission over multiple time slots in accordance with one or more aspects of the present disclosure. The circular buffer 400-*b* may implement or be implemented by aspects of the bi-directional transmission 400-*a* as described with reference to FIG. 4A. Additionally, the circular buffer 400-*b* may implement or be implemented by aspects of the wireless communications system 100 or wireless communications system 200, as described with reference to FIGS. 1 and 2, respectively. For example, the circular buffer 400-*b* may be implemented by a network entity 105, a base station 140, and a UE 115, which may be an example of a network entity 105, a base station 140, and a UE 115 as described with reference to FIGS. 1 and 2, respectively. In the following description of the circular buffer 400-*b*, the operations between a network entity 105, a base station 140, and UE 115 may be transmitted or performed in different orders or at different times. Some operations or components may also be omitted from the circular buffer 400-*b*, or other operations or components may be added to the circular buffer 400-*b*.

In the example of FIG. 4B, operation of the circular buffer 400-*b* may be implemented by a network entity 105, a base station 140, and a UE 115 may be based on a respective RV bundle, a repetition of bits, or an index, or a combination thereof. For example, an RV 420-*a* may be an example of an index type RV0. The RV 420-*a* may include multiple sets of bits. For example, the RV 420-*a* may include four segments (a first segment 435-*a*, a second segment 435-*b*, a third segment 435-*c*, and a fourth segment 435-*d*). Each segment 435 may be associated with a time slot for TBoMS. For example, the first segment 435-*a* may be associated with a first time slot 410-*b*, the second segment 435-*b* may be associated with a second time slot 410-*g*, the third segment 435-*c* may be associated with a third time slot 410-1, and the fourth segment 435-*d* may be associated with a fourth time slot 410-*q*.

One or more bits for each time slot may be configured or handled within a respective segment 435. For example, bits of a TB portion 415-*a*, transmitted during a time slot 410-*b*, may be handled by the first segment 435-*a*. In some cases, the starting point of each segment 435 may be precomputed or preconfigured. In some examples, the starting point of each segment 435 may indicate the starting bit of each respective time slot 410. For example, using the starting point of each segment 435, or the starting bit of each associated time slot 410, the network entity 105, the base station 140, or the UE 115 may determine the remaining bits of the respective time slot 410.

One or more bits of a respective RV 420 may be systematic bits (e.g., 425-*a* and 425-*b*), which may also be referred to as a copy of the TB payload bits. Additionally, one or more other bits of the RVs 420 may be encoded bits of the TB (e.g., 430-*a* and 430-*b*), which may also be referred to as parity bits. The encoded bits 430 may be linearly derived from the systematic bits 425 and appended to the systematic bits 425. In some cases, the network entity 105 or the base station 140 may use the encoded bits 430 to determine the systematic bits 425.

In some cases, the starting point of each segment 435 may be precomputed or preconfigured. In some examples, the starting point of each segment 435 may indicate the starting bit of each respective time slot 410. For example, using the starting point of each segment 435, or the starting bit of each associated time slot 410, the UE 115 may determine the remaining bits of the respective time slot 410. In some examples, gaps may occur between one or more segments 435 (e.g., due to UCI multiplexing). Additionally, or alternatively, the stop and start locations across time slots 410 (e.g., slots) may be decoupled from each other. For example, the TBoMS may be able to operate independent of other dynamic processes.

Figure 5:
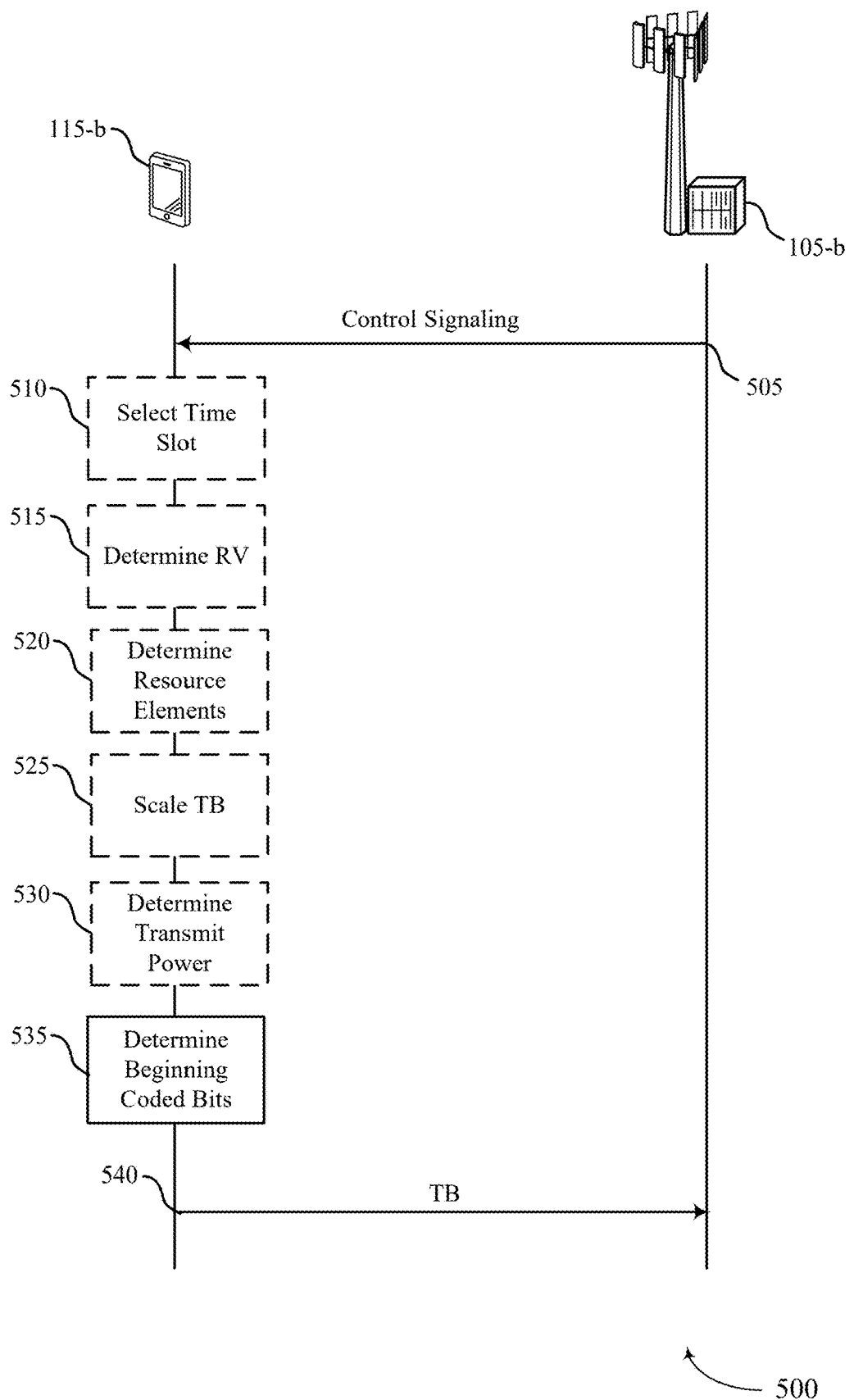
FIGS. 5 through 7 illustrate examples of process flows that support TB transmission over multiple time slots in accordance with one or more aspects of the present disclosure.

FIG. 5 illustrates an example of a process flow 500 that supports TB transmission over multiple time slots in accordance with one or more aspects of the present disclosure. In some examples, the process flow 500 may implement or be implemented by aspects of the wireless communications system 100 or the wireless communications system 200 as described with reference to FIGS. 1 and 2, respectively. For example, the process flow 500 may be implemented by a network entity 105-*b* and a UE 115-*b*, which may be examples of a network entity 105 and a UE 115 as described with reference to FIGS. 1 and 2. The process flow 500 may be implemented by the network entity 105-*b* and the UE 115-*b* to exchange signaling to promote power saving at the UE 115-*b* and reliable communications between the network entity 105-*b* and the UE 115-*b*. In the following description of the process flow 500, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 500, and other operations may be added to the process flow 500.

At 505, the network entity 105-*b* may transmit (e.g., output), and the UE 115-*b* may receive (e.g., obtain), control signaling including a grant (e.g., an uplink grant) for time and frequency resources. In some examples, the network entity 105-*b* may transmit, and the UE 115-*b* may receive, a semi-static message, such as an RRC message including a grant that schedules and allocates time and frequency resources for wireless communication at the UE 115-*b*. In some other examples, the network entity 105-*b* may transmit, and the UE 115-*b* may receive, a dynamic message, such as a MAC-CE or a DCI that schedules and allocates time and frequency resources for wireless communication at the UE 115-*b*. In the example of FIG. 5, the network entity 105-*b* may allocate a number of time slots (e.g., a number of slots) for the wireless communication. An example of wireless communication may include uplink transmission of a TB over the number of time slots as described herein.

At 510, optionally, the UE 115-*b* may select a time slot (e.g., a first time slot). The UE 115-*b* may select the time slot from a set of time slots indicated by the network entity 105-*b*. The time slot may be selected as a starting time slot for the transmission of the TB to the network entity 105-*b*. In some examples, the time slot may be selected based on being an uplink time slot. In some other examples, the UE 115-*b* may be configured (e.g., by an RV index) to select the time slot as the starting time slot. For example, the selected time slot may be a first time slot associated with the RV index (e.g., RV0). Additionally or alternatively, the selected time slot may be an uplink time slot associated with the RV index of a TBoMS.

At 515, optionally, the UE 115-*b* may determine an RV associated with each of one or more time slots. For example, one or more of the time slots may be associated with a first RV index (e.g., RV0) and one or more other time slots may be associated with a second RV index (e.g., RV2). The time slots associated with the first RV index may include a first transmission of first respective coded bits of the TB and the time slots associated with the second RV index may include a transmission of second respective coded bits of the TB. In some examples, all time slots may associated with a same RV index (e.g., RV0). For example, a single TB transmission.

At 520, optionally, the UE 115-*b* may determine resource elements for the TBoMS. For example, the UE 115-*b* may determine resource elements associated with one or more of time slots. At 525, optionally, the UE 115-*b* may scale the TB based on the number of time slots used. For example, when the same resources are available for each time slot, the TB size may be scaled by a factor value (e.g., K) such that the TB may be transmitted over a number of time slots (e.g., N), where K is equal to N (e.g., N=K). In such an example, an effective code rate of the transmission may not deviate from a code rate indicated by a modulation and coding scheme (MCS). With an unchanged effective code rate, the transmission may be more predictable (e.g., for a legacy PUSCH, new operating points with different coding rates may be unnecessary).

In some cases, for full duplex time slots (e.g., SBFD), actual resources may be different from nominal resources. In such cases, the UE 115-*b* may decouple the scaling factor value (e.g., K) from the number of time slots for the TBoMS (e.g., N). For example, for some SBFD operation, the UE 115-*b* may allow K to be a value different than N (e.g., N≠K). Alternatively, the UE 115-*b* may use the full duplex time slots as fractional time slots. For example, one full duplex slot may be treated as a fraction (e.g., half) of an uplink slot. In such an example, the scaling factor value may remain equal to (e.g., N=K).

At 530, optionally, the UE 115-*b* may determine a transmit power. For example, the UE 115-*b* may use actual or nominal resources available for the TBoMS in order to compute a transmit power. In some examples, the transmit power may be computed in order to calculate bits per resource element (BPRE). At 535, the UE 115-*b* may determine a starting index of each respective time slot. For example, the UE 115-*b* may determine a starting index for each time slot (e.g., the index of a first bit of a set of bits to be transmitted during each time slot). In some cases, the UE 115-*b* may determine a respective bit index for each time slot based on a number of resources allocated to each time slot, which may be indicated by the grant, for example, received at 505. Additionally or alternatively, the UE 115-*b* may determine the respective starting index based on an RV index, which may the starting index for the entire subset of bits (e.g., the RV bundle). The subsequent starting indexes of each time slot may be computed based at least in part on the starting index of the entire subset of bits. As another example, the determination of each respective starting coded bit for each slot may be based on the slot type.

At 540, the UE 115-*b* may transmit, and the network entity 105-*b* may receive (e.g., obtain), the TB based on determining the starting index. In some cases, the TB may be transmitted over uplink time slots, full duplex time slots, or some combination thereof. In some examples, mixed mode operation (e.g., transmitting across uplink time slots and full duplex time slots) may not be enabled. In some cases, the UE 115-*b* may transmit the TB based on enabling the UE 115-*b* to determine the starting index. Additionally or alternatively, the UE 115-*b* may transmit the TB based on a multiplexing operation, the RV bundle, resource elements, or a combination thereof associated with one or more of the time slots. In some cases, the transmitting may further be based on the scaling of the TB, the determined transmit power, or both.

By enabling the UE 115-*b* to determine starting bit for each time slot and allocation of bits of TB across multiple time slots, the UE 115-*b* will experience higher reliability and lower latency of wireless communication with the network entity 105-*b* by mitigating retransmissions. Additionally, by enabling the UE 115-*b* to determine starting bit for each time slot and allocation of bits of TB across multiple time slots, the UE 115-*b* may experience power saving by avoiding retransmission of data.

Figure 6:
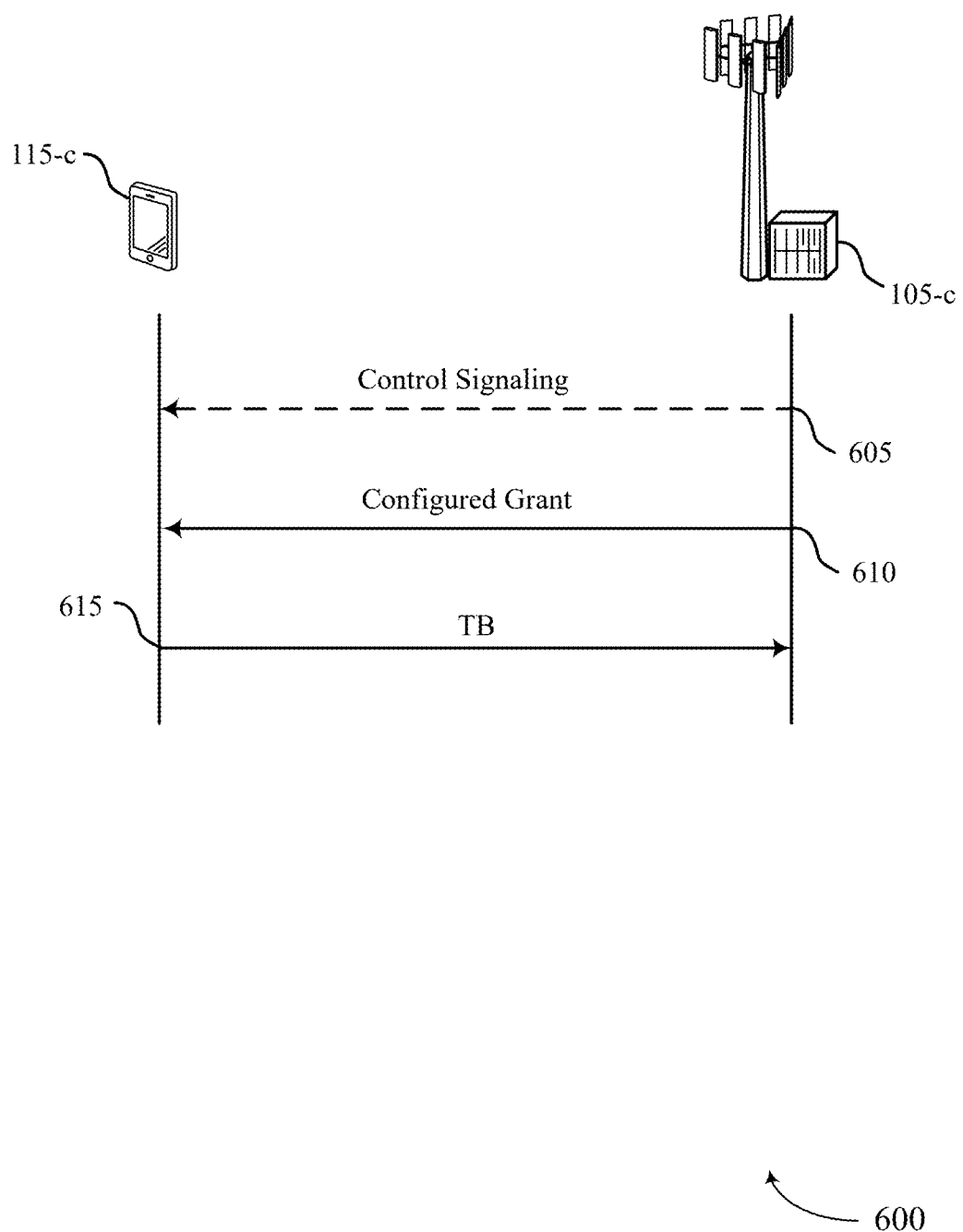

FIG. 6 illustrates an example of a process flow 600 that supports TB transmission over multiple time slots in accordance with one or more aspects of the present disclosure. In some examples, the process flow 600 may implement or be implemented by aspects of the wireless communications system 100 or the wireless communications system 200 as described with reference to FIGS. 1 and 2, respectively. For example, the process flow 600 may be implemented by a network entity 105-*c* and a UE 115-*c*, which may be examples of a network entity 105 and a UE 115 as described with reference to FIGS. 1 and 2. The process flow 600 may be implemented by the network entity 105-*c* and the UE 115-*c* to exchange signaling to promote power saving at the UE 115-*c* and reliable communications between the network entity 105-*c* and the UE 115-*c*. In the following description of the process flow 600, the operations between the network entity 105-*c* and the UE 115-*c* may be transmitted in a different order than the example order shown, or the operations performed by the network entity 105-*c* and the UE 115-*c* may be performed in different orders or at different times. Some operations may also be omitted from the process flow 600, and other operations may be added to the process flow 600.

At 605, the network entity 105-*c* may transmit (e.g., output), and the UE 115-*c* may receive (e.g., obtain), control signaling including scheduling (e.g., allocating) time and frequency resources. In some examples, the network entity 105-*c* may transmit, and the UE 115-*c* may receive, a semi-static message, such as an RRC message including a grant that schedules and allocates time and frequency resources for wireless communication at the UE 115-*c*. In some other examples, the network entity 105-*c* may transmit, and the UE 115-*c* may receive, a dynamic message, such as a MAC-CE or a DCI that schedules and allocates time and frequency resources for wireless communication at the UE 115-*c*. In the example of FIG. 6, the network entity 105-*c* may allocate a number of time slots (e.g., a number of slots) for the wireless communication. An example of wireless communication may include uplink transmission of a TB over the number of time slots as described herein.

At 610, optionally, the network entity 105-*c* may transmit (e.g., output), and the UE 115-*c* may receive (e.g., obtain), a configured grant for transmission of a TB over the set of time slots. In some examples, the UE 115-*c* may determine a beginning time slots for the transmission of the TB based on the configured grant. At 615, the UE 115-*c* may transmit, and the network entity 105-*c* may receive (e.g., obtain), the TB based on the received configured grant. In some examples, the UE 115-*c* may transmit the TB over the set of time slots may be based on the beginning time slot. In some other examples, the beginning time slot corresponds to uplink. In other examples, the beginning time slot corresponds a redundancy version index of zero.

Figure 7:
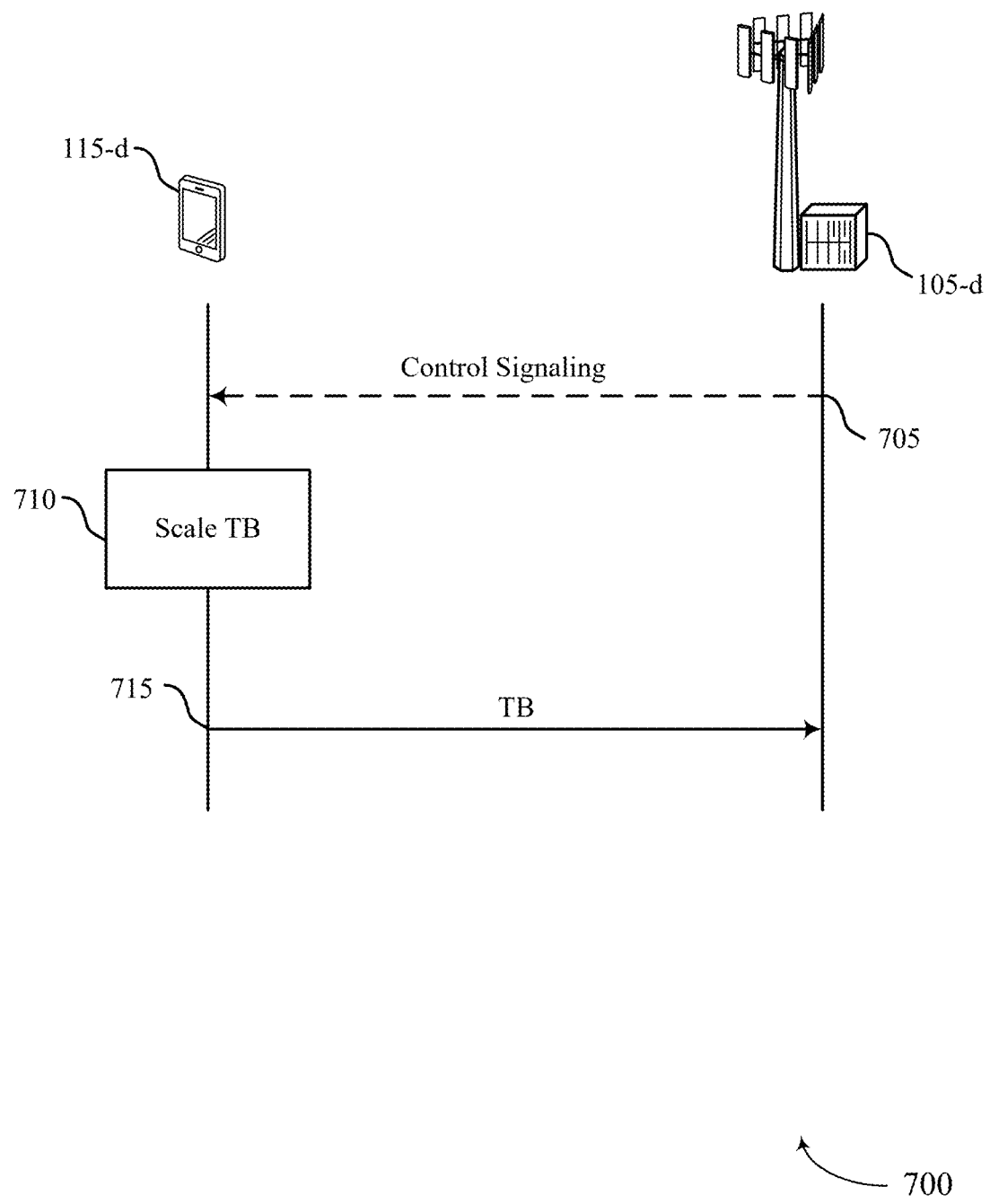

FIG. 7 illustrates an example of a process flow 700 that supports TB transmission over multiple time slots in accordance with one or more aspects of the present disclosure. In some examples, the process flow 700 may implement or be implemented by aspects of the wireless communications system 100 or the wireless communications system 200 as described with reference to FIGS. 1 and 2, respectively. For example, the process flow 700 may be implemented by a network entity 105-*d* and a UE 115-*d*, which may be examples of a network entity 105 and a UE 115 as described with reference to FIGS. 1 and 2. The process flow 700 may be implemented by the network entity 105-*d* and the UE 115-*d* to exchange signaling to promote power saving at the UE 115-*d* and reliable communications between the network entity 105-*d* and the UE 115-*d*. In the following description of the process flow 700, the operations between the network entity 105-*d* and the UE 115-*d* may be transmitted in a different order than the example order shown, or the operations performed by the network entity 105-*d* and the UE 115-*d* may be performed in different orders or at different times. Some operations may also be omitted from the process flow 700, and other operations may be added to the process flow 700.

At 705, the network entity 105-*d* may transmit (e.g., output), and the UE 115-*d* may receive (e.g., obtain), control signaling including scheduling (e.g., allocating) time and frequency resources. In some examples, the network entity 105-*d* may transmit, and the UE 115-*d* may receive, a semi-static message, such as an RRC message including a grant that schedules and allocates time and frequency resources for wireless communication at the UE 115-*d*. In some other examples, the network entity 105-*d* may transmit, and the UE 115-*d* may receive, a dynamic message, such as a MAC-CE or a DCI that schedules and allocates time and frequency resources for wireless communication at the UE 115-*d*. In the example of FIG. 7, the network entity 105-*d* may allocate a number of time slots (e.g., a number of slots) for the wireless communication. An example of wireless communication may include uplink transmission of a TB over the number of time slots as described herein.

At 710, the UE 115-d may scale a size of the TB based on a first value independent of a second value associated with a number of time slots associated with the set of time slots. At 715, the UE 115-c may transmit, and the network entity 105-c may receive (e.g., obtain), the TB based on scaling the size of the TB. Each time slot associated with both the uplink and the downlink corresponds to a fractional value associated with a value for scaling a size of the TB.

Figure 8:
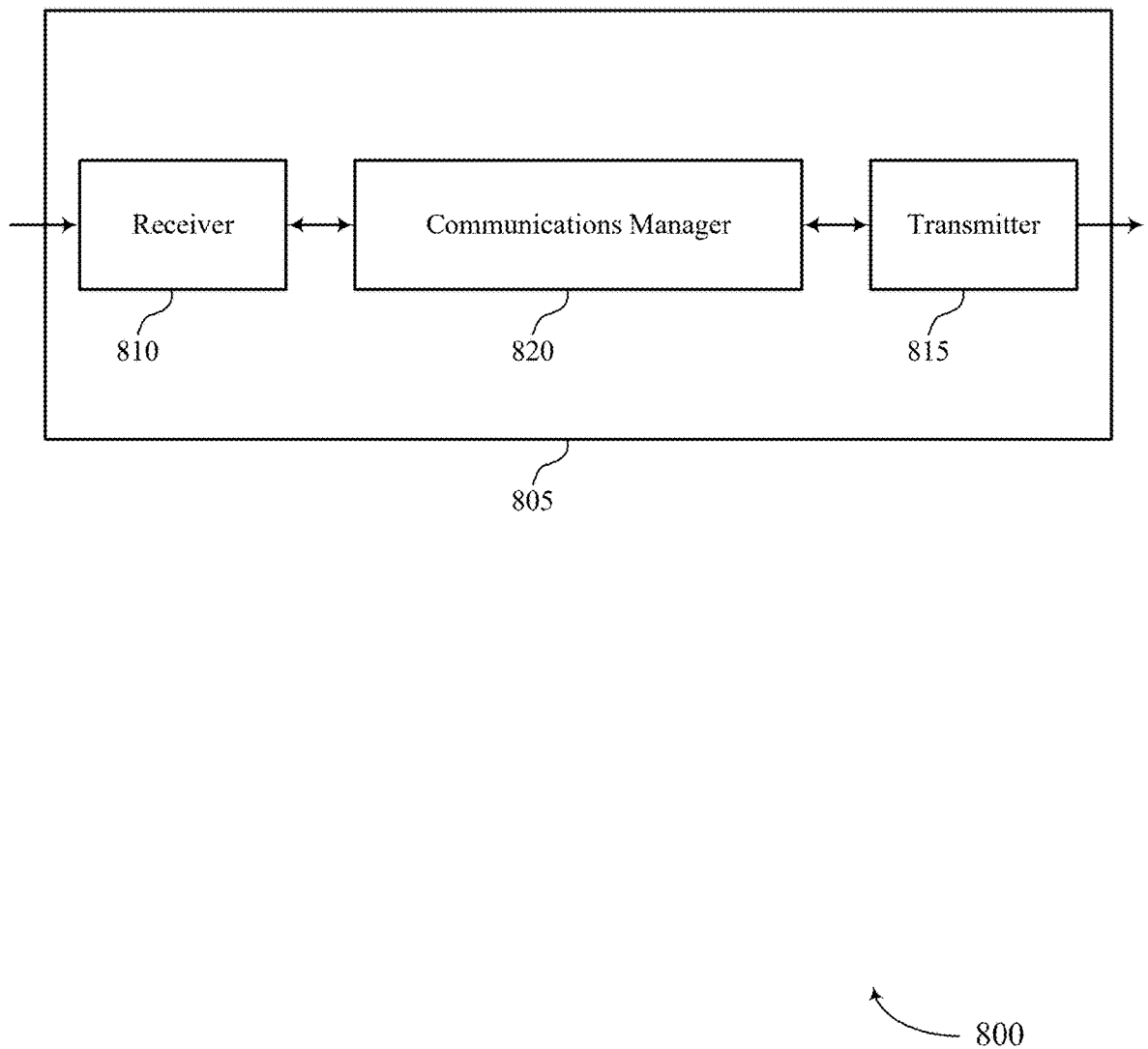
FIGS. 8 and 9 show block diagrams of devices that support TB transmission over multiple time slots in accordance with one or more aspects of the present disclosure.

FIG. 8 shows a block diagram 800 of a device 805 that supports TB transmission over multiple time slots in accordance with one or more aspects of the present disclosure. The device 805 may be an example of aspects of a network entity 105, a base station 140, or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to TB transmission over multiple time slots). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to TB transmission over multiple time slots). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of TB transmission over multiple time slots as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at the device 805 in accordance with examples as disclosed herein. For example, the communications manager 820 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The communications manager 820 may be configured as or otherwise support a means for determining one or more respective starting index of one or more respective subset of coded bits of the set of coded bits based on the resource allocation, each of the one or more respective subset of coded bits for transmission during a respective time slot of the set of time slots. The communications manager 820 may be configured as or otherwise support a means for transmitting the TB over the set of time slots based on the determining.

Additionally, or alternatively, the communications manager 820 may support wireless communication in accordance with examples as disclosed herein. The communications manager 820 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The communications manager 820 may be configured as or otherwise support a means for receiving a configured grant for a transmission of the TB over the set of time slots. The communications manager 820 may be configured as or otherwise support a means for transmitting the TB over the set of time slots based on the received configured grant.

Additionally, or alternatively, the communications manager 820 may support wireless communication in accordance with examples as disclosed herein. The communications manager 820 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The communications manager 820 may be configured as or otherwise support a means for scaling a size of the TB based on a first value independent of a second value associated with a number of time slots associated with the set of time slots. The communications manager 820 may be configured as or otherwise support a means for transmitting the TB over the set of time slots based on scaling the size of the TB.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, and more efficient utilization of communication resources.

Figure 9:
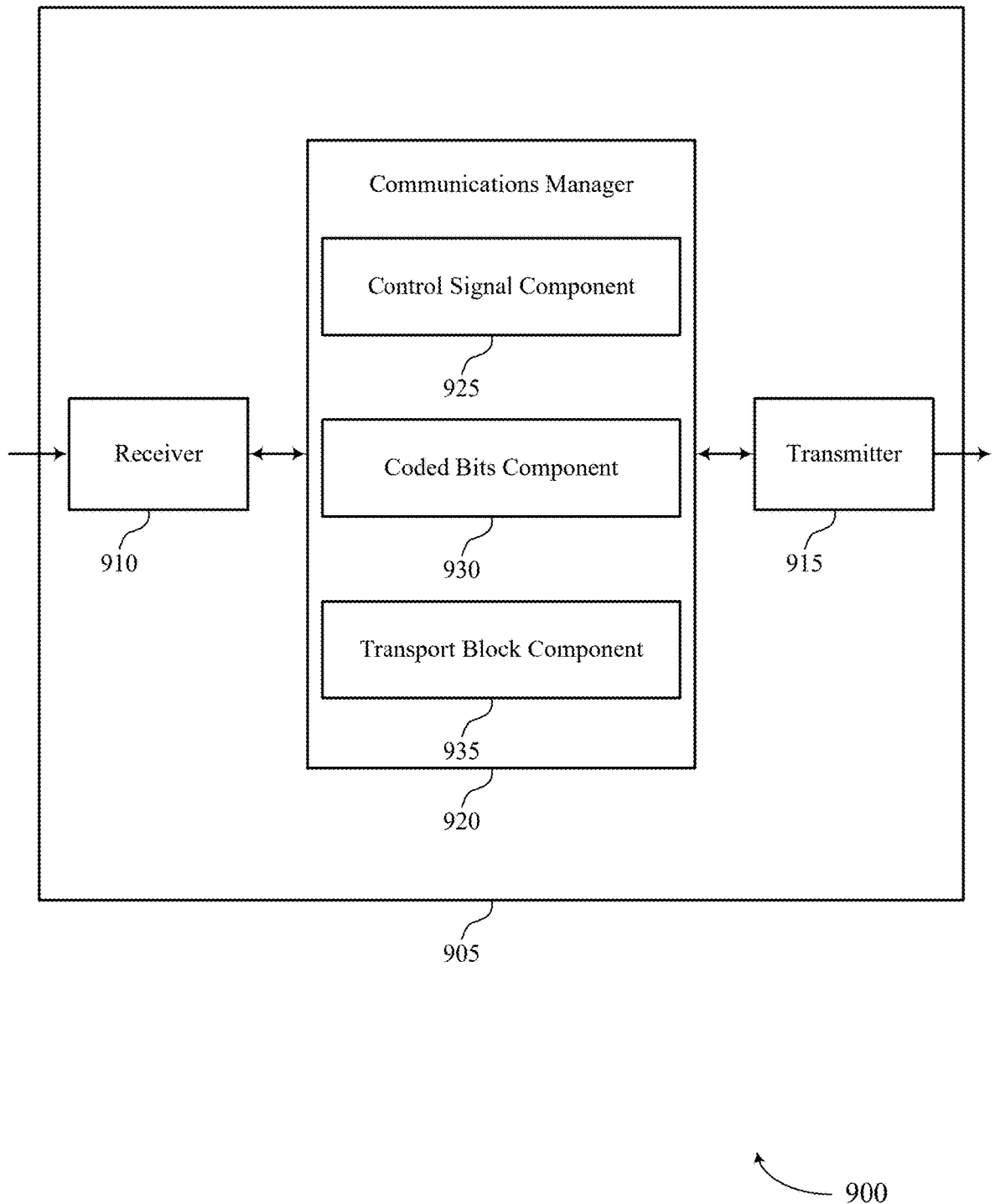

FIG. 9 shows a block diagram 900 of a device 905 that supports TB transmission over multiple time slots in accordance with one or more aspects of the present disclosure. The device 905 may be an example of aspects of a device 805, or a network entity 105, a base station 140, or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to TB transmission over multiple time slots). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to TB transmission over multiple time slots). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of TB transmission over multiple time slots as described herein. For example, the communications manager 920 may include a control signal component 925, a coded bits component 930, a TB component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at the device 905 in accordance with examples as disclosed herein. The control signal component 925 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The coded bits component 930 may be configured as or otherwise support a means for determining one or more respective starting indexes of one or more respective subset of coded bits of the set of coded bits based on the resource allocation, each of the one or more respective subset of coded bits for transmission during a respective subset of time slots of the set of time slots. The TB component 935 may be configured as or otherwise support a means for transmitting the TB over the set of time slots based on the determining.

Additionally, or alternatively, the communications manager 920 may support wireless communication in accordance with examples as disclosed herein. The control signal component 925 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The control signal component 925 may be configured as or otherwise support a means for receiving a configured grant for a transmission of the TB over the set of time slots. The TB component 930 may be configured as or otherwise support a means for transmitting the TB over the set of time slots based on the received configured grant.

Additionally, or alternatively, the communications manager 920 may support wireless communication in accordance with examples as disclosed herein. The control signal component 925 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The control signal component 925 may be configured as or otherwise support a means for scaling a size of the TB based on a first value independent of a second value associated with a number of time slots associated with the set of time slots. The TB component 930 may be configured as or otherwise support a means for transmitting the TB over the set of time slots based on scaling the size of the TB.

Figure 10:
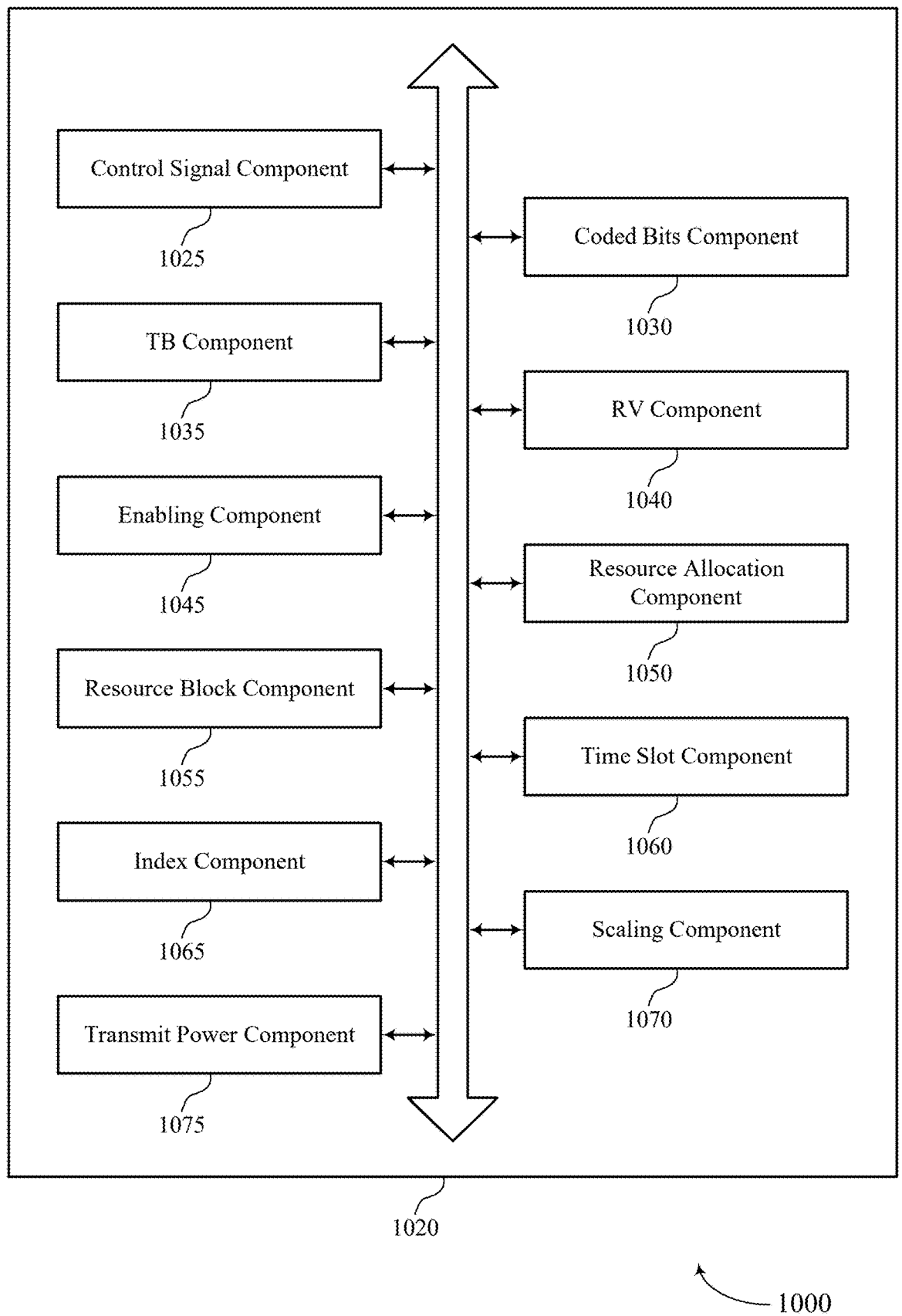
FIG. 10 shows a block diagram of a communications manager that supports TB transmission over multiple time slots in accordance with one or more aspects of the present disclosure.

FIG. 10 shows a block diagram 1000 of a communications manager 1020 that supports TB transmission over multiple time slots in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of TB transmission over multiple time slots as described herein. For example, the communications manager 1020 may include a control signal component 1025, a coded bits component 1030, a TB component 1035, a RV component 1040, an enabling component 1045, a resource allocation component 1050, a resource block component 1055, a time slot component 1060, an index component 1065, a scaling component 1070, a transmit power component 1075, or any combination thereof. Each of these components may communicate, directly or indirectly, with one another (e.g., via one or more buses).

The communications manager 1020 may support wireless communication in accordance with examples as disclosed herein. The control signal component 1025 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The coded bits component 1030 may be configured as or otherwise support a means for determining one or more respective starting index of one or more respective subset of coded bits of the set of coded bits based on the resource allocation, each of the one or more respective subset of coded bits for transmission during a respective subset of time slots of the set of time slots. The TB component 1035 may be configured as or otherwise support a means for transmitting the TB over the set of time slots based on the determining.

In some examples, the RV component 1040 may be configured as or otherwise support a means for determining a respective RV associated with each of the one or more respective subset of coded bits and the respective time slot of the set of time slots. In some examples, the coded bits component 1030 may be configured as or otherwise support a means for determining the one or more respective starting indexes of the one or more respective subset of coded bits of the set of coded bits further based on the determined respective RV associated with the one or more respective subset of coded bits and the respective subset of time slots of the set of time slots.

In some examples, the enabling component 1045 may be configured as or otherwise support a means for enabling the determining of the one or more respective starting indexes of the one or more respective subset of coded bits of the set of coded bits, prior to the transmission of the TB over the set of time slots. In some examples, the TB component 1035 may be configured as or otherwise support a means for transmitting the TB over the set of time slots further based on the enabling. In some examples, each of the one or more time slots of the set of time slots correspond to sub-band full duplex operation. In some examples, the sub-band full duplex operation corresponds to one or both of the uplink or the downlink.

In some examples, the coded bits component 1030 may be configured as or otherwise support a means for determining the one or more respective starting indexes of the one or more respective subset of coded bits of the set of coded bits based on a multiplexing operation associated with each of one or more time slots of the set of time slots, the multiplexing operation corresponding to multiplexing uplink control information over each of the one or more time slots of the set of time slots. In some examples, the TB component 1035 may be configured as or otherwise support a means for transmitting the TB over the set of time slots further based on the multiplexing operation associated with each of the one or more time slots of the set of time slots.

In some examples, the coded bits component 1030 may be configured as or otherwise support a means for determining the one or more respective starting indexes of the one or more respective subset of coded bits of the set of coded bits independent of a multiplexing operation associated with each of one or more time slots of the set of time slots. In some examples, the TB component 1035 may be configured as or otherwise support a means for transmitting the TB over the set of time slots further independent of the multiplexing operation associated with each of the one or more time slots of the set of time slots.

In some examples, the resource allocation component 1050 may be configured as or otherwise support a means for determining a number of modulation symbols, a number of resource blocks, or any combination thereof, based on the resource allocation. In some examples, the coded bits component 1030 may be configured as or otherwise support a means for determining the one or more respective starting indexes of the one or more respective subset of coded bits of the set of coded bits further based on the number of modulation symbols, the number of resource blocks, or any combination thereof.

In some examples, the resource block component 1055 may be configured as or otherwise support a means for determining a number of resource blocks for each of the one or more time slots of the set of time slots based on the resource allocation. In some examples, the resource block component 1055 may be configured as or otherwise support a means for determining that a number of resource blocks available for each of the one or more time slots of the set of time slots is less than the determined number of resource blocks. In some examples, the coded bits component 1030 may be configured as or otherwise support a means for determining the one or more respective starting indexes of the one or more respective subset of coded bits of the set of coded bits further based on determining that the number of resource blocks is less than the determined number of resource blocks. In some examples, the coded bits component 1030 may be configured as or otherwise support a means for determining the one or more respective starting indexes of the one or more respective subset of coded bits of the set of coded bits based on the number of resource blocks.

In some examples, the time slot component 1060 may be configured as or otherwise support a means for selecting a first available time slot of the set of time slots for the transmission of the TB over the set of time slots based on the first available time slot being allocated for the uplink. In some examples, the TB component 1035 may be configured as or otherwise support a means for transmitting the TB over the set of time slots further based on the first available time slot being allocated for the uplink.

In some examples, the index component 1065 may be configured as or otherwise support a means for determining a RV index associated with the transmission of the TB over the set of time slots. In some examples, the time slot component 1060 may be configured as or otherwise support a means for determining a first available time slot of the set of time slots being allocated for the uplink based on the RV index. In some examples, the TB component 1035 may be configured as or otherwise support a means for transmitting the TB over the set of time slots further based on the RV index associated with the transmission of the TB over the set of time slots, the first available time slot of the set of time slots being allocated for the uplink, or both.

In some examples, the RV component 1040 may be configured as or otherwise support a means for updating a respective RV associated with the respective subset of time slots of the set of time slots based on a first time slot corresponding to a first type of time slot different from a second type of time slot associated with a second time slot preceding the first time slot. In some examples, the coded bits component 1030 may be configured as or otherwise support a means for determining the one or more respective starting indexes of the one or more respective subset of coded bits of the set of coded bits further based on updating the respective RV associated with the respective subset of time slots of the set of time slots. In some examples, the first type of time slot and the second type of time slot correspond to the uplink, or the downlink, or both.

In some examples, to support receiving the control signaling, the control signal component 1025 may be configured as or otherwise support a means for receiving a configured grant for the transmission of the TB over the set of time slots. In some examples, to support receiving the control signaling, the TB component 1035 may be configured as or otherwise support a means for transmitting the TB over the set of time slots further based on the configured grant. In some examples, the time slot component 1060 may be configured as or otherwise support a means for determining a beginning time slot for the transmission of the TB based on the configured grant. In some examples, the control signal component 1025 may be configured as or otherwise support a means for transmitting the TB over the set of time slots further based on the beginning time slot. In some examples, the beginning time slot corresponds to the uplink. In some examples, the beginning time slot corresponds a RV index of zero. In some examples, transmitting the TB over the set of time slots is further based on each of the time slots of the set of time slots corresponding to the uplink. In some examples, transmitting the TB over the set of time slots is further based on each of the time slots of the set of time slots corresponding to full duplex associated with the uplink and the downlink.

In some examples, the scaling component 1070 may be configured as or otherwise support a means for scaling a size of the TB based on a first value independent of a second value associated with a number of time slots associated with the set of time slots. In some examples, the TB component 1035 may be configured as or otherwise support a means for transmitting the TB over the set of time slots further based on scaling the size of the TB. In some examples, each time slot associated with both the uplink and the downlink corresponds to a fractional value associated with a value for scaling a size of the TB.

In some examples, the resource allocation component 1050 may be configured as or otherwise support a means for determining a first subset of resource elements for the transmission of the TB over the set of time slots and a second subset of resource elements for multiplexing of uplink control information over the transmission of the TB, where the first subset of resource elements, or the second subset of resource elements, or both correspond to a number of resource elements or a nominal number of resource elements. In some examples, the TB component 1035 may be configured as or otherwise support a means for transmitting the TB over the set of time slots further based on the first subset of resource elements for the transmission of the TB over the set of time slots. In some examples, determining the one or more respective starting indexes of the one or more respective subset of coded bits of the set of coded bits further based on the number of resource elements or the nominal number of resource elements.

In some examples, the resource allocation component 1050 may be configured as or otherwise support a means for determining a number of resource elements or a nominal number of resource elements associated with the transmission of the TB over the set of time slots based on the resource allocation. In some examples, the transmit power component 1075 may be configured as or otherwise support a means for determining a transmit power for the transmission of the TB over the set of time slots based on the number of resource elements or the nominal number of resource elements. In some examples, the TB component 1035 may be configured as or otherwise support a means for transmitting the TB over the set of time slots further based on the transmit power.

In some examples, the set of time slots includes a set of slots, and each of one or more slots of the set of slots includes an uplink slot, a downlink slot, or any combination thereof. In some examples, the set of time slots includes a set of slots, and each of one or more slots of the set of slots includes full duplex slot. In some examples, the set of coded bits includes systematic bits, parity bits, or any combination thereof.

Figure 11:
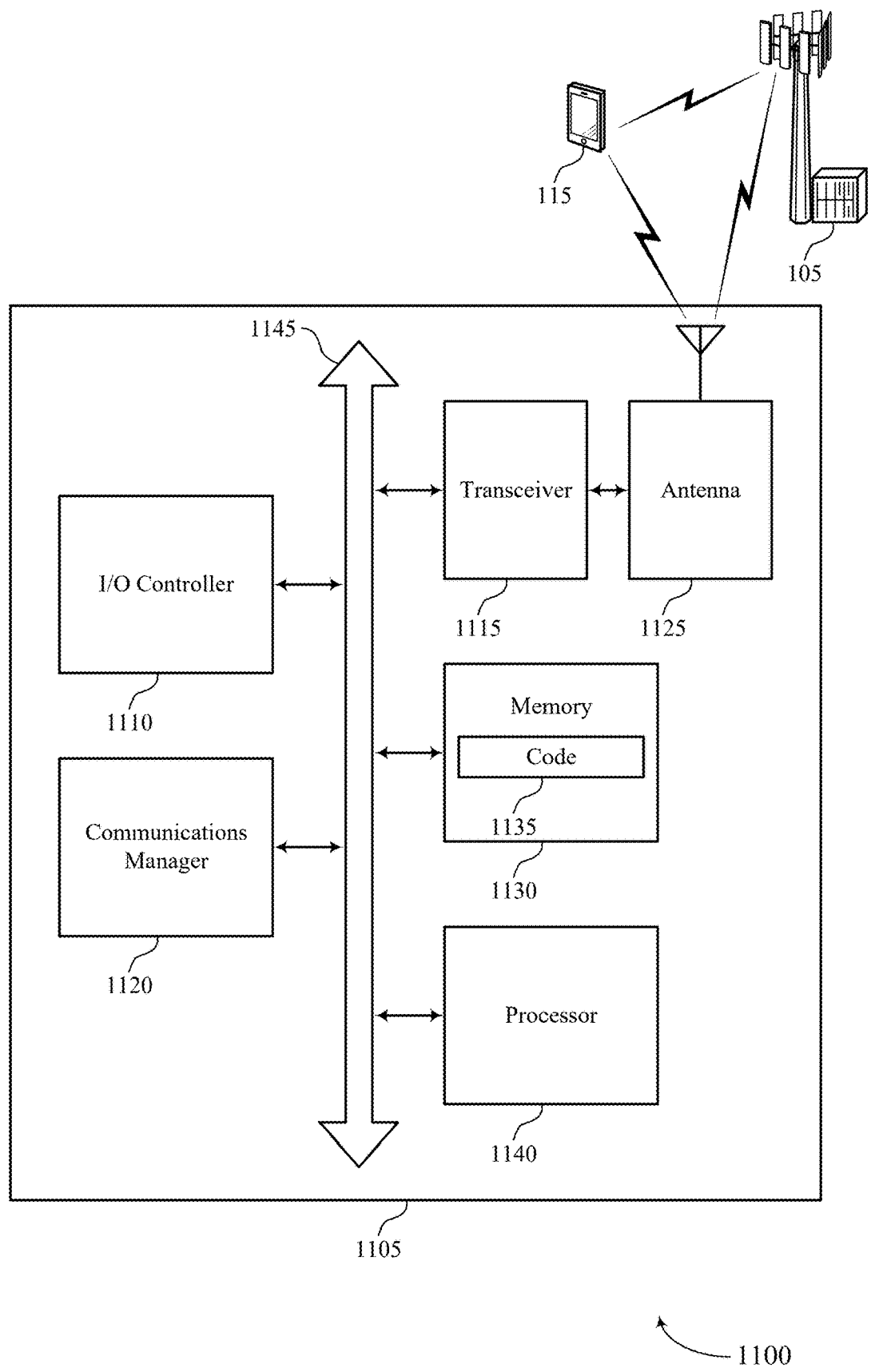
FIG. 11 shows a diagram of a system including a device that supports TB transmission over multiple time slots in accordance with one or more aspects of the present disclosure.

FIG. 11 shows a diagram of a system 1100 including a device 1105 that supports TB transmission over multiple time slots in accordance with one or more aspects of the present disclosure. The device 1105 may be an example of or include the components of a device 805, a device 905, or a network entity 105, a base station 140, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting TB transmission over multiple time slots). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at the device 1105 in accordance with examples as disclosed herein. For example, the communications manager 1120 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The communications manager 1120 may be configured as or otherwise support a means for determining one or more respective starting indexes of one or more respective subset of coded bits of the set of coded bits based on the resource allocation, each of the one or more respective subset of coded bits for transmission during a respective time slot of the set of time slots. The communications manager 1120 may be configured as or otherwise support a means for transmitting the TB over the set of time slots based on the determining.

The communications manager 1120 may support wireless communication at device 1105 in accordance with examples as disclosed herein. For example, the communications manager 1120 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The communications manager 1120 may be configured as or otherwise support a means for receiving a configured grant for a transmission of the TB over the set of time slots. The communications manager 1120 may be configured as or otherwise support a means for transmitting the TB over the set of time slots based on the received configured grant.

Additionally, or alternatively, the communications manager 1120 may support wireless communication in accordance with examples as disclosed herein. For example, the communications manager 1120 may be configured as or otherwise support a means for receiving control signaling indicating a resource allocation for a transmission of a TB over a set of time slots, each of one or more time slots of the set of time slots allocated for one or both of uplink or downlink, where the TB includes a payload including a set of coded bits. The communications manager 1120 may be configured as or otherwise support a means for scaling a size of the TB based on a first value independent of a second value associated with a number of time slots associated with the set of time slots. The communications manager 1120 may be configured as or otherwise support a means for transmitting the TB over the set of time slots based on scaling the size of the TB.

By including or configuring the communications manager 1120 in accordance with examples as described herein, the device 1105 may support techniques for higher communication reliability and lower communication latency, as well as more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of TB transmission over multiple time slots as described herein, or the processor 1140 and the memory 1130 may be otherwise configured to perform or support such operations.

Figure 12:
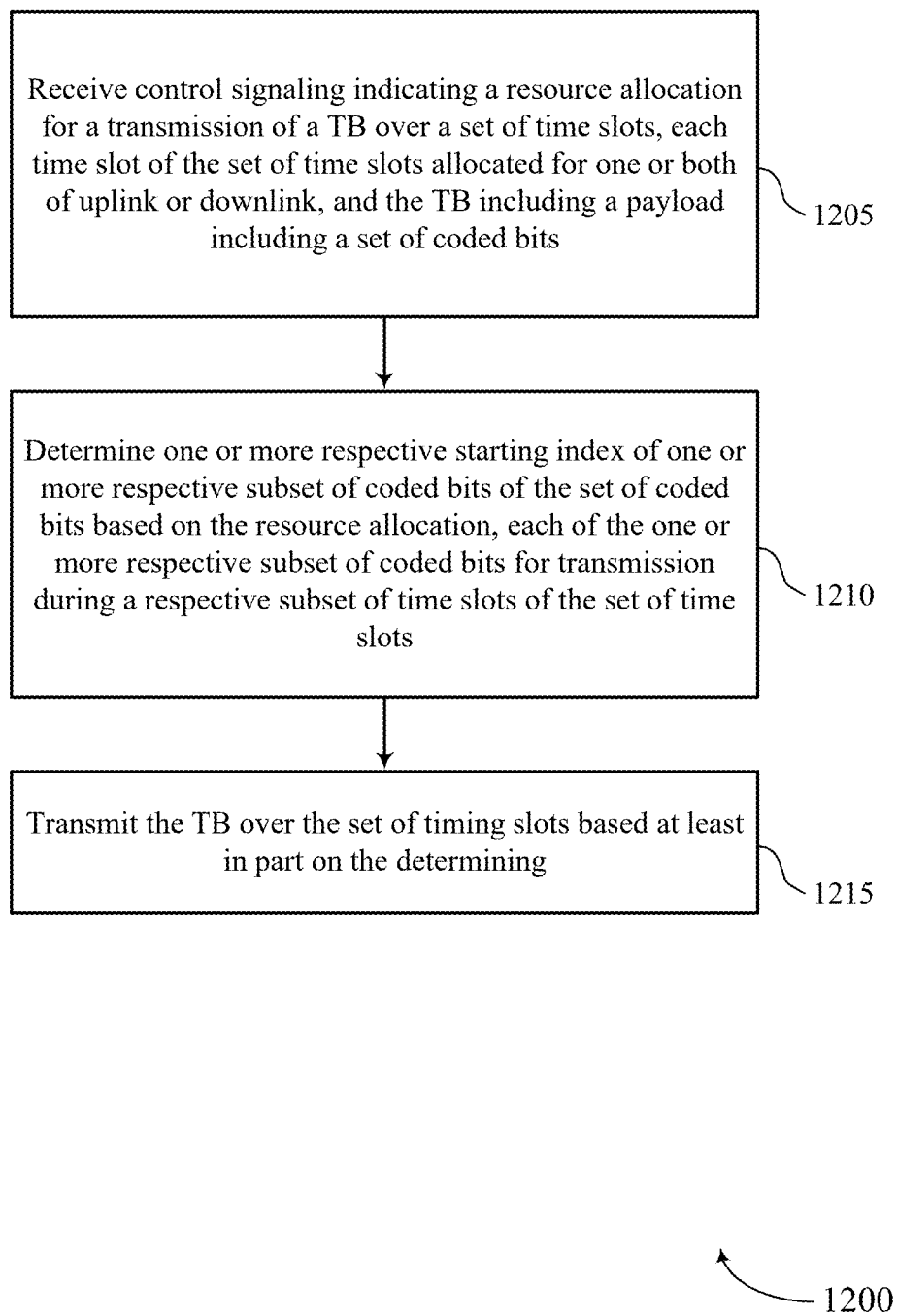
FIGS. 12 through 15 show flowcharts illustrating methods that support TB transmission over multiple time slots in accordance with one or more aspects of the present disclosure.

FIG. 12 shows a flowchart illustrating a method 1200 that supports TB transmission over multiple time slots in accordance with one or more aspects of the present disclosure. The operations of the method 1200 may be implemented by a network entity, a base station, or a UE, or a combination thereof, or components as described herein. For example, the operations of the method 1200 may be performed by a network entity 105, a base station 140, or a UE 115 as described with reference to FIGS. 1 through 11. In some examples, a network entity, a base station, or a UE may execute a set of instructions to control the functional elements of the network entity, the base station, or the UE to perform the described functions. Additionally, or alternatively, the UE may perform aspects of the described functions using special-purpose hardware.

At 1205, the method may include receiving control signaling indicating a resource allocation for a transmission of a TB over a set of time slots, each of one or more time slots of the set of time slots allocated for one or both of uplink or downlink, where the TB includes a payload including a set of coded bits. The operations of 1205 may be performed in accordance with examples as disclosed herein. In some examples, aspects of the operations of 1205 may be performed by a control signal component 1025 as described with reference to FIG. 10.

At 1210, the method may include determining one or more respective starting indexes bits of one or more respective subset of coded bits of the set of coded bits based on the resource allocation, each of the one or more respective subset of coded bits for transmission during a respective time slot of the set of time slots. The operations of 1210 may be performed in accordance with examples as disclosed herein. In some examples, aspects of the operations of 1210 may be performed by a coded bits component 1030 as described with reference to FIG. 10.

At 1215, the method may include transmitting the TB over the set of time slots based on the determining. The operations of 1215 may be performed in accordance with examples as disclosed herein. In some examples, aspects of the operations of 1215 may be performed by a TB component 1035 as described with reference to FIG. 10.

Figure 13:
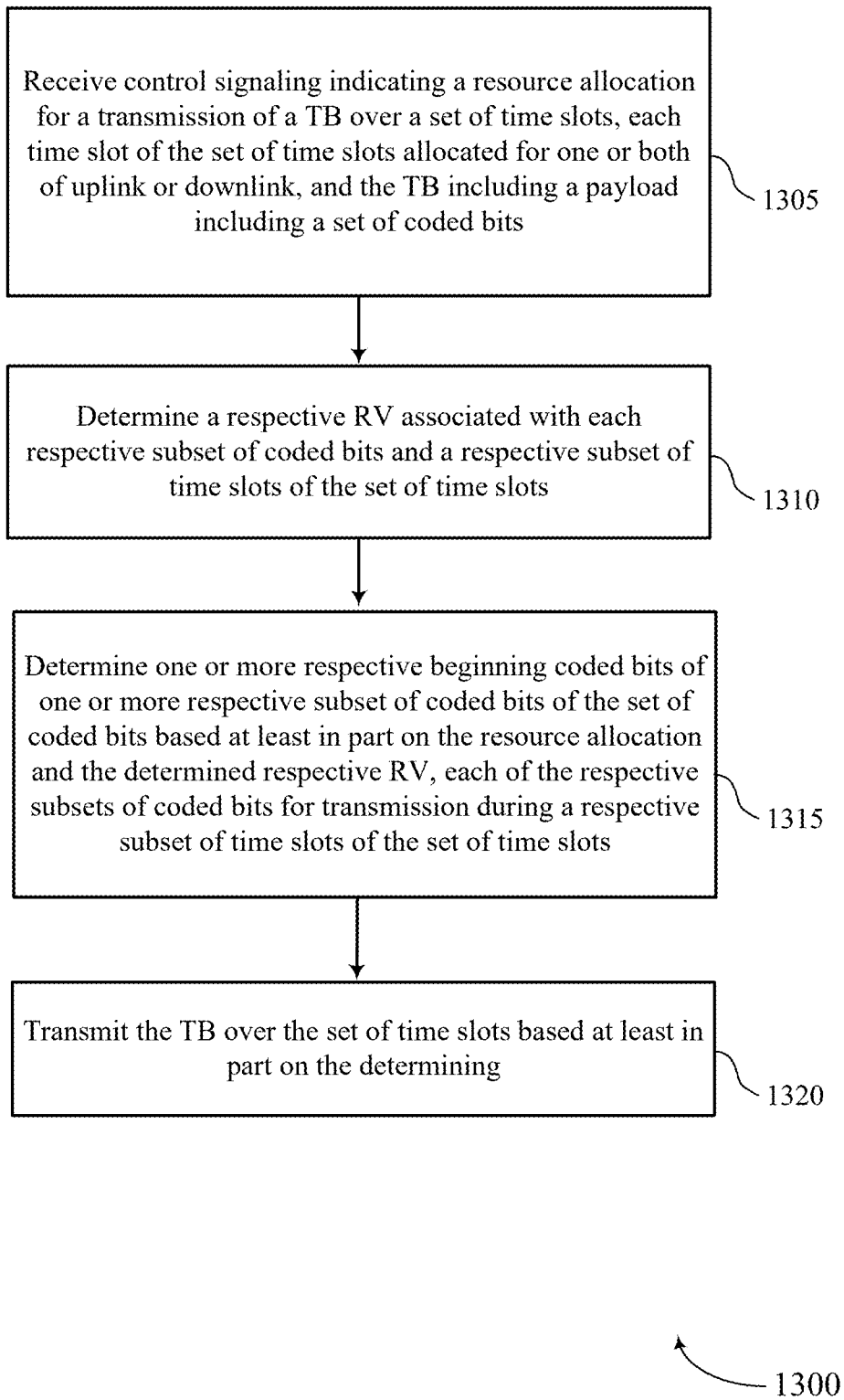

FIG. 13 shows a flowchart illustrating a method 1300 that supports TB transmission over multiple time slots in accordance with one or more aspects of the present disclosure. The operations of the method 1300 may be implemented by a network entity, a base station, or a UE, or a combination thereof, or components as described herein. For example, the operations of the method 1300 may be performed by a network entity 105, a base station 140, or a UE 115 as described with reference to FIGS. 1 through 11. In some examples, a network entity, a base station, or a UE may execute a set of instructions to control the functional elements of the network entity, the base station, or the UE to perform the described functions. Additionally, or alternatively, the network entity, the base station, or the UE may perform aspects of the described functions using special-purpose hardware.

At 1305, the method may include receiving control signaling indicating a resource allocation for a transmission of a TB over a set of time slots, each of one or more time slots of the set of time slots allocated for one or both of uplink or downlink, where the TB includes a payload including a set of coded bits. The operations of 1305 may be performed in accordance with examples as disclosed herein. In some examples, aspects of the operations of 1305 may be performed by a control signal component 1025 as described with reference to FIG. 10.

At 1310, the method may include determining a respective RV associated with each of the one or more respective subset of coded bits and a respective time slot of the set of time slots. The operations of 1310 may be performed in accordance with examples as disclosed herein. In some examples, aspects of the operations of 1310 may be performed by a RV component 1040 as described with reference to FIG. 10.

At 1315, the method may include determining one or more respective starting indexes bits of one or more respective subset of coded bits of the set of coded bits based on the resource allocation and the determined respective RV, each of the one or more respective subset of coded bits for transmission during a respective time slot of the set of time slots. The operations of 1315 may be performed in accordance with examples as disclosed herein. In some examples, aspects of the operations of 1315 may be performed by a coded bits component 1030 as described with reference to FIG. 10.

At 1320, the method may include transmitting the TB over the set of time slots based on the determining. The operations of 1320 may be performed in accordance with examples as disclosed herein. In some examples, aspects of the operations of 1320 may be performed by a TB component 1035 as described with reference to FIG. 10.

Figure 14:
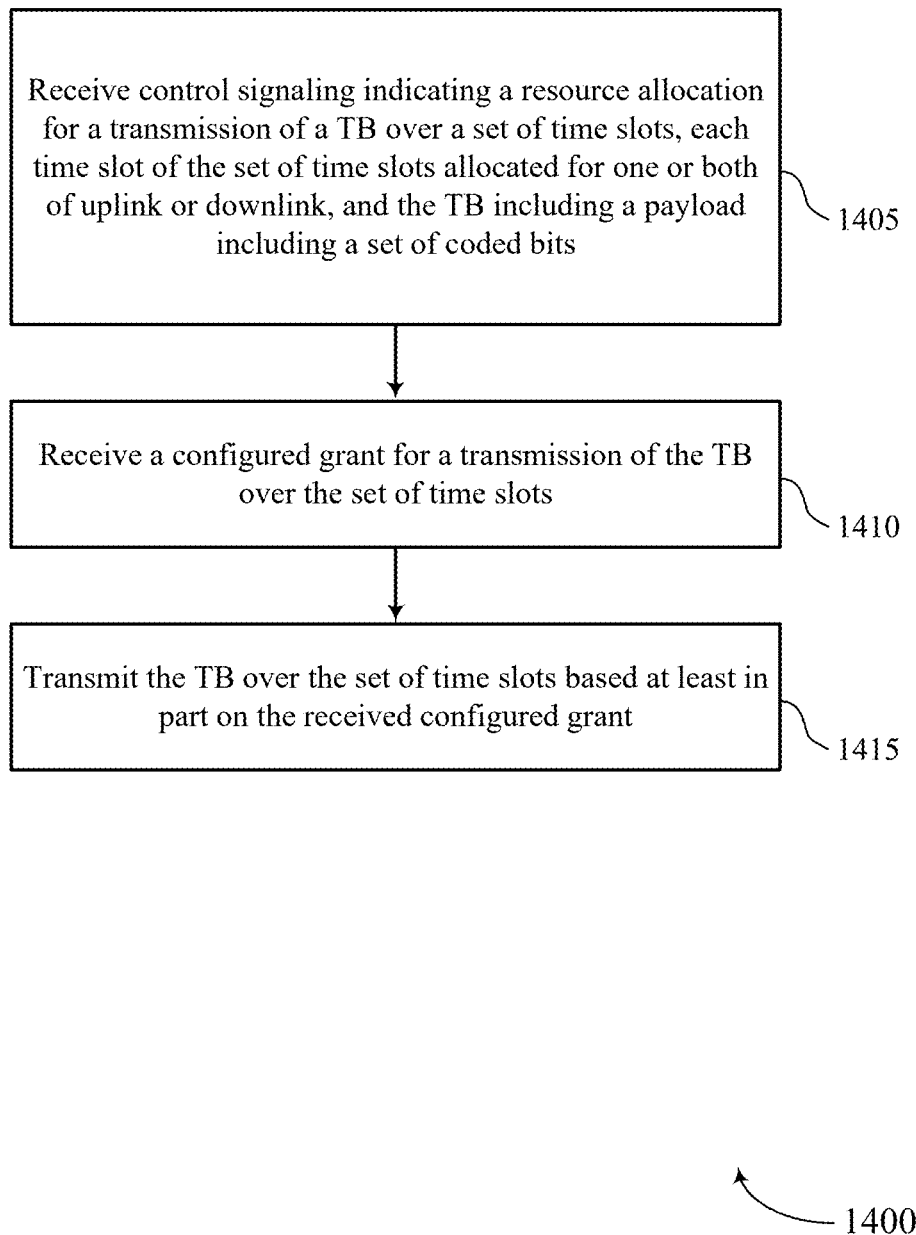

FIG. 14 shows a flowchart illustrating a method 1400 that supports TB transmission over multiple time slots in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a resource allocation for a transmission of a TB over a set of time slots, each of one or more time slots of the set of time slots allocated for one or both of uplink or downlink, where the TB includes a payload including a set of coded bits. The operations of 1405 may be performed in accordance with examples as disclosed herein. In some examples, aspects of the operations of 1405 may be performed by a control signal component 1025 as described with reference to FIG. 10.

At 1410, the method may include receiving a configured grant for a transmission of the TB over the set of time slots. The operations of 1410 may be performed in accordance with examples as disclosed herein. In some examples, aspects of the operations of 1410 may be performed by a control signal component 1025 as described with reference to FIG. 10.

At 1415, the method may include transmitting the TB over the set of time slots based on the received configured grant. The operations of 1415 may be performed in accordance with examples as disclosed herein. In some examples, aspects of the operations of 1415 may be performed by a TB component 1030 as described with reference to FIG. 10.

Figure 15:
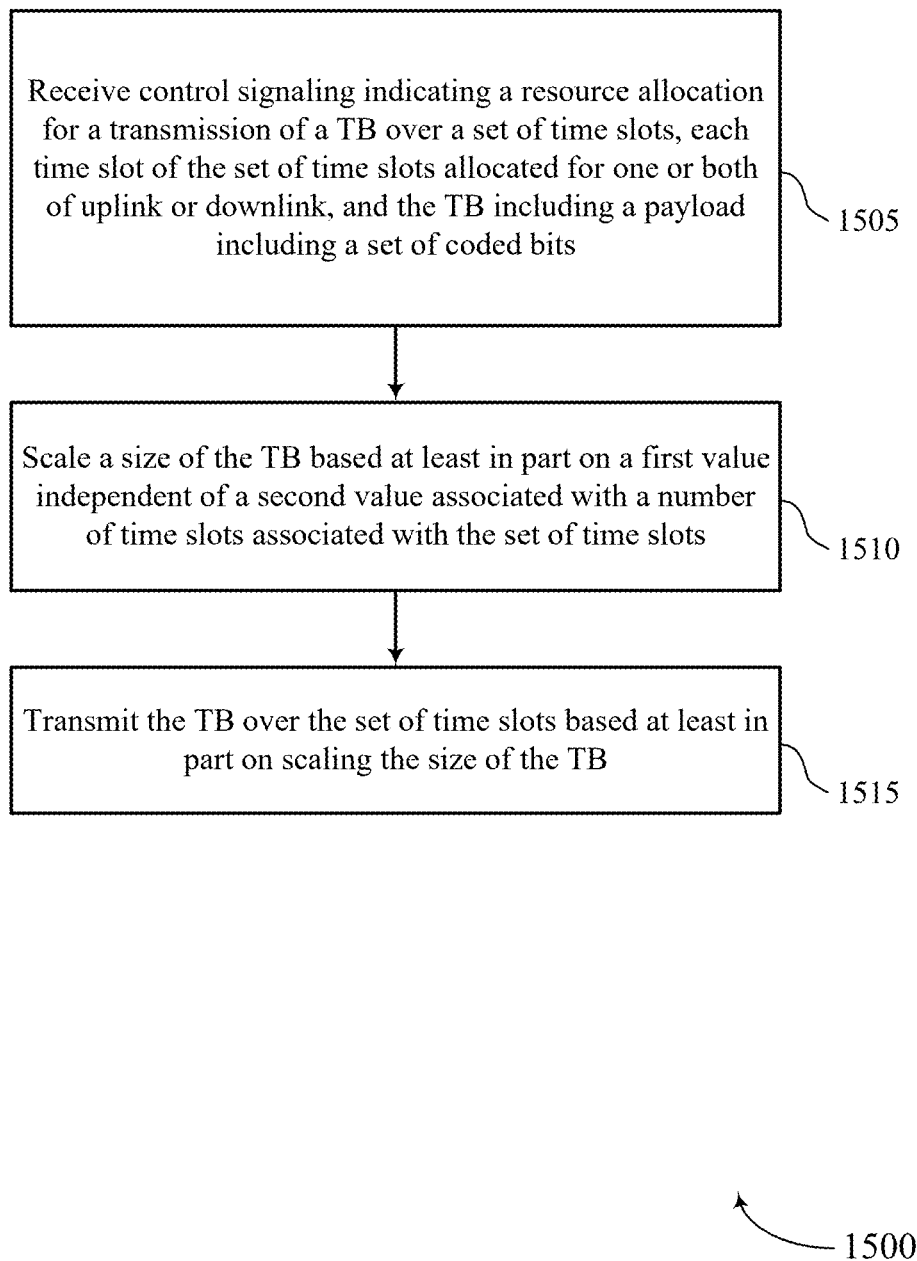

FIG. 15 shows a flowchart illustrating a method 1500 that supports TB transmission over multiple time slots in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a resource allocation for a transmission of a TB over a set of time slots, each of one or more time slots of the set of time slots allocated for one or both of uplink or downlink, where the TB includes a payload including a set of coded bits. The operations of 1505 may be performed in accordance with examples as disclosed herein. In some examples, aspects of the operations of 1505 may be performed by a control signal component 1025 as described with reference to FIG. 10.

At 1510, the method may include scaling a size of the TB based on a first value independent of a second value associated with a number of time slots associated with the set of time slots. The operations of 1510 may be performed in accordance with examples as disclosed herein. In some examples, aspects of the operations of 1510 may be performed by a scaling component 1070 as described with reference to FIG. 10.

At 1515, the method may include transmitting the TB over the set of time slots based on scaling the size of the TB. The operations of 1515 may be performed in accordance with examples as disclosed herein. In some examples, aspects of the operations of 1515 may be performed by a TB component 1030 as described with reference to FIG. 10.

The following provides an overview of aspects of the present disclosure:

Aspect 1: A method for wireless communication, comprising: receiving control signaling indicating a resource allocation for a transmission of a TB over a set of time slots, each of one or more time slots of the set of time slots allocated for one or both of uplink or downlink, wherein the TB comprises a payload including a set of coded bits; determining one or more starting indexes of one or more respective subset of coded bits of the set of coded bits based at least in part on the resource allocation, each of the one or more respective subset of coded bits for transmission during a respective subset of time slots of the set of time slots; and transmitting the TB over the set of time slots based at least in part on the determining.

Aspect 2: The method of aspect 1, further comprising: determining a respective redundancy version associated with each of the one or more respective subset of coded bits and the respective subset of time slots of the set of time slots, wherein determining the one or more respective starting indexes of the one or more respective subset of coded bits of the set of coded bits is further based at least in part on the determined respective redundancy version associated with the one or more respective subset of coded bits and the respective subset of time slots of the set of time slots.

Aspect 3: The method of any of aspects 1 through 2, further comprising: enabling the determining of the one or more respective starting indexes of the one or more respective subset of coded bits of the set of coded bits, prior to the transmission of the TB over the set of time slots, wherein transmitting the TB over the set of time slots is further based at least in part on the enabling.

Aspect 4: The method of aspect 3, wherein each of the one or more time slots of the set of time slots correspond to sub-band full duplex operation, and the sub-band full duplex operation corresponds to one or both of the uplink or the downlink.

Aspect 5: The method of any of aspects 1 through 4, further comprising: determining the one or more respective starting indexes of the one or more respective subset of coded bits of the set of coded bits based at least in part on a multiplexing operation associated with each of one or more time slots of the set of time slots, the multiplexing operation corresponding to multiplexing uplink control information over each of the one or more time slots of the set of time slots, wherein transmitting the TB over the set of time slots is further based at least in part on the multiplexing operation associated with each of the one or more time slots of the set of time slots.

Aspect 6: The method of any of aspects 1 through 5, further comprising: determining the one or more respective starting indexes of the one or more respective subset of coded bits of the set of coded bits independent of a multiplexing operation associated with each of one or more time slots of the set of time slots, wherein transmitting the TB over the set of time slots is further independent of the multiplexing operation associated with each of the one or more time slots of the set of time slots.

Aspect 7: The method of any of aspects 1 through 6, further comprising: determining a number of modulation symbols, a number of resource blocks, or any combination thereof, based at least in part on the resource allocation, wherein determining the one or more respective starting indexes of the one or more respective subset of coded bits of the set of coded bits is further based at least in part on the number of modulation symbols, the number of resource blocks, or any combination thereof.

Aspect 8: The method of any of aspects 1 through 7, further comprising: determining a number of resource blocks for each of the one or more time slots of the set of time slots based at least in part on the resource allocation; and determining that a number of resource blocks available for each of the one or more time slots of the set of time slots is less than the determined number of resource blocks, wherein determining the one or more respective starting indexes of the one or more respective subset of coded bits of the set of coded bits is further based at least in part on determining that the number of resource blocks is less than the determined number of resource blocks.

Aspect 9: The method of aspect 8, further comprising: determining the one or more respective starting indexes of the one or more respective subset of coded bits of the set of coded bits based at least in part on the number of resource blocks.

Aspect 10: The method of any of aspects 1 through 9, further comprising: selecting a first available time slot of the set of time slots for the transmission of the TB over the set of time slots based at least in part on the first available time slot being allocated for the uplink, wherein transmitting the TB over the set of time slots is further based at least in part on the first available time slot being allocated for the uplink.

Aspect 11: The method of any of aspects 1 through 10, further comprising: determining a redundancy version index associated with the transmission of the TB over the set of time slots; and determining a first available time slot of the set of time slots being allocated for the uplink based at least in part on the redundancy version index, wherein transmitting the TB over the set of time slots is further based at least in part on the redundancy version index associated with the transmission of the TB over the set of time slots, the first available time slot of the set of time slots being allocated for the uplink, or both.

Aspect 12: The method of any of aspects 1 through 11, further comprising: updating a respective redundancy version associated with the respective subset of time slots of the set of time slots based at least in part on a first time slot corresponding to a first type of time slot different from a second type of time slot associated with a second time slot preceding the first time slot, wherein determining the one or more respective starting indexes of the one or more respective subset of coded bits of the set of coded bits is further based at least in part on updating the respective redundancy version associated with the respective subset of time slots of the set of time slots.

Aspect 13: The method of aspect 12, wherein the first type of time slot and the second type of time slot correspond to the uplink, or the downlink, or both.

Aspect 14: The method of any of aspects 1 through 13, wherein receiving the control signaling comprises: receiving a configured grant for the transmission of the TB over the set of time slots, wherein transmitting the TB over the set of time slots is further based at least in part on the configured grant.

Aspect 15: The method of aspect 14, further comprising: determining a beginning time slot for the transmission of the TB based at least in part on the configured grant, wherein transmitting the TB over the set of time slots is further based at least in part on the beginning time slot.

Aspect 16: The method of aspect 15, wherein the beginning time slot corresponds to the uplink.

Aspect 17: The method of any of aspects 15 through 16, wherein the beginning time slot corresponds to a redundancy version index of zero.

Aspect 18: The method of any of aspects 1 through 17, wherein transmitting the TB over the set of time slots is further based at least in part on each of the time slots of the set of time slots corresponding to the uplink.

Aspect 19: The method of any of aspects 1 through 18, wherein transmitting the TB over the set of time slots is further based at least in part on each of the time slots of the set of time slots corresponding to full duplex associated with the uplink and the downlink.

Aspect 20: The method of any of aspects 1 through 19, further comprising: scaling a size of the TB based at least in part on a first value independent of a second value associated with a number of time slots associated with the set of time slots, wherein transmitting the TB over the set of time slots is further based at least in part on scaling the size of the TB.

Aspect 21: The method of any of aspects 1 through 20, wherein each time slot associated with both the uplink and the downlink corresponds to a fractional value associated with a value for scaling a size of the TB.

Aspect 22: The method of any of aspects 1 through 21, further comprising: determining a first subset of resource elements for the transmission of the TB over the set of time slots and a second subset of resource elements for multiplexing of uplink control information over the transmission of the TB, wherein the first subset of resource elements, or the second subset of resource elements, or both correspond to a number of resource elements or a nominal number of resource elements, wherein transmitting the TB over the set of time slots is further based at least in part on the first subset of resource elements for the transmission of the TB over the set of time slots.

Aspect 23: The method of aspect 22, wherein determining the one or more respective starting indexes of the one or more respective subset of coded bits of the set of coded bits is further based at least in part on the number of resource elements or the nominal number of resource elements.

Aspect 24: The method of any of aspects 1 through 23, further comprising: determining a number of resource elements or a nominal number of resource elements associated with the transmission of the TB over the set of time slots based at least in part on the resource allocation; and determining a transmit power for the transmission of the TB over the set of time slots based at least in part on the number of resource elements or the nominal number of resource elements, wherein transmitting the TB over the set of time slots is further based at least in part on the transmit power.

Aspect 25: The method of any of aspects 1 through 24, wherein the set of time slots comprises a set of slots, and each of one or more slots of the set of slots comprises an uplink slot, a downlink slot, or any combination thereof.

Aspect 26: The method of any of aspects 1 through 25, wherein the set of time slots comprises a set of slots, and each of one or more slots of the set of slots comprises full duplex slot.

Aspect 27: The method of any of aspects 1 through 26, wherein the set of coded bits comprises systematic bits, parity bits, or any combination thereof.

Aspect 28: An apparatus for wireless communication, comprising a processor; memory coupled with the processor; and instructions stored in the memory and executable by the processor to cause the apparatus to perform a method of any of aspects 1 through 27.

Aspect 29: An apparatus for wireless communication, comprising at least one means for performing a method of any of aspects 1 through 27.

Aspect 30: A non-transitory computer-readable medium storing code for wireless communication, the code comprising instructions executable by a processor to perform a method of any of aspects 1 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
receiving control signaling indicating a resource allocation for a transmission of a transport block over a set of time slots, each of one or more time slots of the set of time slots allocated for one or both of uplink or downlink, wherein the transport block comprises a payload including a set of coded bits;
determining one or more starting indexes of one or more respective subset of coded bits of the set of coded bits based at least in part on the resource allocation, each of the one or more respective subset of coded bits for transmission during a respective subset of time slots of the set of time slots;
determining a transmit power for transmission of the transport block over the set of time slots based at least in part on a number of resource elements or a nominal number of resource elements; and
transmitting the transport block over the set of time slots based at least in part on the one or more starting indexes and the transmit power.

2. The method of claim 1, further comprising:
determining a respective redundancy version associated with each of the one or more respective subset of coded bits and the respective subset of time slots of the set of time slots,
wherein determining the one or more respective starting indexes of the one or more respective subset of coded bits of the set of coded bits is further based at least in part on the determined respective redundancy version associated with the one or more respective subset of coded bits and the respective subset of time slots of the set of time slots.

3. The method of claim 1, further comprising:
enabling the determining of the one or more respective starting indexes of the one or more respective subset of coded bits of the set of coded bits, prior to the transmission of the transport block over the set of time slots,
wherein transmitting the transport block over the set of time slots is further based at least in part on the enabling.

4. The method of claim 3, wherein each of the one or more time slots of the set of time slots correspond to sub-band full duplex operation, and the sub-band full duplex operation corresponds to one or both of the uplink or the downlink.

5. The method of claim 1, further comprising:
determining the one or more respective starting indexes of the one or more respective subset of coded bits of the set of coded bits based at least in part on a multiplexing operation associated with each of one or more time slots of the set of time slots, the multiplexing operation corresponding to multiplexing uplink control information over each of the one or more time slots of the set of time slots,
wherein transmitting the transport block over the set of time slots is further based at least in part on the multiplexing operation associated with each of the one or more time slots of the set of time slots.

6. The method of claim 1, further comprising:
determining the one or more respective starting indexes of the one or more respective subset of coded bits of the set of coded bits independent of a multiplexing operation associated with each of one or more time slots of the set of time slots,
wherein transmitting the transport block over the set of time slots is further independent of the multiplexing operation associated with each of the one or more time slots of the set of time slots.

7. The method of claim 1, further comprising:
determining a number of modulation symbols, a number of resource blocks, or any combination thereof, based at least in part on the resource allocation, wherein determining the one or more respective starting indexes of the one or more respective subset of coded bits of the set of coded bits is further based at least in part on the number of modulation symbols, the number of resource blocks, or any combination thereof.

8. The method of claim 1, further comprising:
determining a number of resource blocks for each of the one or more time slots of the set of time slots based at least in part on the resource allocation; and
determining that a number of resource blocks available for each of the one or more time slots of the set of time slots is less than the determined number of resource blocks,
wherein determining the one or more respective starting indexes of the one or more respective subset of coded bits of the set of coded bits is further based at least in part on determining that the number of resource blocks is less than the determined number of resource blocks.

9. The method of claim 8, further comprising:
determining the one or more respective starting indexes of the one or more respective subset of coded bits of the set of coded bits based at least in part on the number of resource blocks.

10. The method of claim 1, further comprising:
selecting a first available time slot of the set of time slots for the transmission of the transport block over the set of time slots based at least in part on the first available time slot being allocated for the uplink,
wherein transmitting the transport block over the set of time slots is further based at least in part on the first available time slot being allocated for the uplink.

11. The method of claim 1, further comprising:
determining a redundancy version index associated with the transmission of the transport block over the set of time slots; and
determining a first available time slot of the set of time slots being allocated for the uplink based at least in part on the redundancy version index,
wherein transmitting the transport block over the set of time slots is further based at least in part on the redundancy version index associated with the transmission of the transport block over the set of time slots, the first available time slot of the set of time slots being allocated for the uplink, or both.

12. The method of claim 1, further comprising:
updating a respective redundancy version associated with the respective subset of time slots of the set of time slots based at least in part on a first time slot corresponding to a first type of time slot different from a second type of time slot associated with a second time slot preceding the first time slot,
wherein determining the one or more respective starting indexes of the one or more respective subset of coded bits of the set of coded bits is further based at least in part on updating the respective redundancy version associated with the respective subset of time slots of the set of time slots.

13. The method of claim 12, wherein the first type of time slot and the second type of time slot correspond to the uplink, or the downlink, or both.

14. The method of claim 1, wherein receiving the control signaling comprises:
receiving a configured grant for the transmission of the transport block over the set of time slots,
wherein transmitting the transport block over the set of time slots is further based at least in part on the configured grant.

15. The method of claim 14, further comprising:
determining a beginning time slot for the transmission of the transport block based at least in part on the configured grant,
wherein transmitting the transport block over the set of time slots is further based at least in part on the beginning time slot.

16. The method of claim 15, wherein the beginning time slot corresponds to the uplink.

17. The method of claim 15, wherein the beginning time slot corresponds toa redundancy version index of zero.

18. The method of claim 1, wherein transmitting the transport block over the set of time slots is further based at least in part on each of the time slots of the set of time slots corresponding to the uplink.

19. The method of claim 1, wherein transmitting the transport block over the set of time slots is further based at least in part on each of the time slots of the set of time slots corresponding to full duplex associated with the uplink and the downlink.

20. The method of claim 1, further comprising:
scaling a size of the transport block based at least in part on a first value independent of a second value associated with a number of time slots associated with the set of time slots,
wherein transmitting the transport block over the set of time slots is further based at least in part on scaling the size of the transport block.

21. The method of claim 1, wherein each time slot associated with both the uplink and the downlink corresponds to a fractional value associated with a value for scaling a size of the transport block.

22. The method of claim 1, further comprising:
determining a first subset of resource elements for the transmission of the transport block over the set of time slots and a second subset of resource elements for multiplexing of uplink control information over the transmission of the transport block, wherein the first subset of resource elements, or the second subset of resource elements, or both correspond to a number of resource elements or a nominal number of resource elements,
wherein transmitting the transport block over the set of time slots is further based at least in part on the first subset of resource elements for the transmission of the transport block over the set of time slots.

23. The method of claim 22, wherein determining the one or more respective starting indexes of the one or more respective subset of coded bits of the set of coded bits is further based at least in part on the number of resource elements or the nominal number of resource elements.

24. The method of claim 1, further comprising:
determining the number of resource elements or the nominal number of resource elements associated with the transmission of the transport block over the set of time slots based at least in part on the resource allocation.

25. The method of claim 1, wherein the set of time slots comprises a set of slots, and each of one or more slots of the set of slots comprises an uplink slot, a downlink slot, or any combination thereof.

26. The method of claim 1, wherein the set of time slots comprises a set of slots, and each of one or more slots of the set of slots comprises full duplex slot.

27. The method of claim 1, wherein the set of coded bits comprises systematic bits, parity bits, or any combination thereof.

28. An apparatus for wireless communication, comprising:
- a processor;
- memory coupled with the processor; and
- instructions stored in the memory and executable by the processor to cause the apparatus to:
  - receive control signaling indicating a resource allocation for a transmission of a transport block over a set of time slots, each of one or more time slots of the set of time slots allocated for one or both of uplink or downlink, wherein the transport block comprises a payload including a set of coded bits;
  - determine one or more respective starting indexes of one or more respective subset of coded bits of the set of coded bits based at least in part on the resource allocation, each of the one or more respective subset of coded bits for transmission during a respective subset of time slots of the set of time slots;
  - determine a transmit power for transmission of the transport block over the set of time slots based at least in part on a number of resource elements or a nominal number of resource elements; and
  - transmit the transport block over the set of time slots based at least in part on the one or more starting indexes and the transmit power.

29. An apparatus for wireless communication, comprising:
- means for receiving control signaling indicating a resource allocation for a transmission of a transport block over a set of time slots, each of one or more time slots of the set of time slots allocated for one or both of uplink or downlink, wherein the transport block comprises a payload including a set of coded bits;
- means for determining one or more respective starting indexes of one or more respective subset of coded bits of the set of coded bits based at least in part on the resource allocation, each of the one or more respective subset of coded bits for transmission during a respective subset of time slots of the set of time slots;
- means for determining a transmit power for transmission of the transport block over the set of time slots based at least in part on a number of resource elements or a nominal number of resource elements; and
- means for transmitting the transport block over the set of time slots based at least in part on the one or more starting indexes and the transmit power.

30. A non-transitory computer-readable medium storing code for wireless communications, the code comprising instructions executable by a processor to:
- receive control signaling indicating a resource allocation for a transmission of a transport block over a set of time slots, each of one or more time slots of the set of time slots allocated for one or both of uplink or downlink, wherein the transport block comprises a payload including a set of coded bits;
- determine one or more respective starting index of one or more respective subset of coded bits of the set of coded bits based at least in part on the resource allocation, each of the one or more respective subset of coded bits for transmission during a respective subset of time slots of the set of time slots;
- determine a transmit power for transmission of the transport block over the set of time slots based at least in part on a number of resource elements or a nominal number of resource elements; and
- transmit the transport block over the set of time slots based at least in part on the one or more starting indexes and the transmit power.

* * * * *